United States Patent
Lee et al.

(10) Patent No.: US 8,984,561 B2
(45) Date of Patent: Mar. 17, 2015

(54) MOVING-IMAGE PLAYING APPARATUS AND METHOD

(71) Applicant: Samsung Electronics Co. Ltd., Suwon-si, Gyeonggi-do (KR)

(72) Inventors: Chang-Joon Lee, Yongin-si (KR); Kwan-Woong Song, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/867,739

(22) Filed: Apr. 22, 2013

(65) Prior Publication Data

US 2013/0312026 A1    Nov. 21, 2013

(30) Foreign Application Priority Data

May 15, 2012    (KR) .......................... 10-2012-0051304

(51) Int. Cl.

| | |
|---|---|
| G06F 3/00 | (2006.01) |
| G06F 13/00 | (2006.01) |
| H04N 5/445 | (2011.01) |
| H04N 21/234 | (2011.01) |
| H04N 21/43 | (2011.01) |
| H04N 21/431 | (2011.01) |
| H04N 21/44 | (2011.01) |
| H04N 21/8547 | (2011.01) |

(52) U.S. Cl.
CPC ....... *H04N 21/234* (2013.01); *H04N 21/23412* (2013.01); *H04N 21/4307* (2013.01); *H04N 21/4312* (2013.01); *H04N 21/44012* (2013.01); *H04N 21/8547* (2013.01)
USPC ................ 725/59; 725/32; 725/37; 725/135; 715/716; 715/719; 715/723

(58) Field of Classification Search
USPC .......................... 725/32, 37, 59, 135; 715/723
See application file for complete search history.

(56) References Cited

U.S. PATENT DOCUMENTS

| | | | |
|---|---|---|---|
| 6,601,237 B1 * | 7/2003 | Ten Kate et al. ................. 725/47 |
| 7,196,722 B2 * | 3/2007 | White et al. ............. 348/211.99 |
| 2003/0197785 A1 * | 10/2003 | White et al. ............. 348/207.99 |
| 2005/0278618 A1 * | 12/2005 | Ogikubo ........................ 715/513 |
| 2006/0239648 A1 * | 10/2006 | Varghese ......................... 386/95 |
| 2008/0209468 A1 * | 8/2008 | Milosevski ..................... 725/39 |
| 2009/0009605 A1 * | 1/2009 | Ortiz ............................. 348/157 |
| 2009/0089352 A1 * | 4/2009 | Davis et al. ................... 709/201 |
| 2010/0225811 A1 * | 9/2010 | Konvisser ..................... 348/512 |
| 2010/0289900 A1 | 11/2010 | Ortiz |
| 2011/0029417 A1 * | 2/2011 | Tijerino .......................... 705/30 |
| 2011/0164858 A1 * | 7/2011 | Motosaka et al. ............. 386/278 |
| 2013/0125000 A1 * | 5/2013 | Fleischhauer et al. ........ 715/723 |
| 2013/0176493 A1 * | 7/2013 | Khosla ........................... 348/563 |

* cited by examiner

*Primary Examiner* — Robert Hance
(74) *Attorney, Agent, or Firm* — Jefferson IP Law, LLP

(57) ABSTRACT

An apparatus and a method for playing a plurality of moving images as one moving image are provided. The apparatus at a terminal includes a display unit for playing the plurality of moving images as one moving image and a controller for connecting the plurality of moving images through connection information for a respective one of the plurality of moving images to play the plurality of moving images as one moving image. The apparatus at a server includes a controller for connecting or converting the plurality of moving images as or into one moving image through connection information for a respective one of the plurality of moving images, and for performing a control operation to sequentially transmit the plurality of moving images according to the connection information in a streaming manner to a terminal, and a transmitter for sequentially transmitting the plurality of moving images to the terminal.

57 Claims, 14 Drawing Sheets

MOVING-IMAGE PLAYING APPARATUS AND METHOD

PRIORITY

This application claims the benefit under 35 U.S.C. §119 (a) of a Korean patent application filed on May 15, 2012 in the Korean Intellectual Property Office and assigned Serial No. 10-2012-0051304, the entire disclosure of which is hereby incorporated by reference.

BACKGROUND OF THE INVENTION

1. Field of the Invention

The present invention relates to a moving-image playing apparatus and method. More particularly, the present invention relates to a moving-image playing apparatus and a method for playing a plurality of moving images as one moving image.

2. Description of the Related Art

Generally, a terminal selects a user desired file from a moving-image file list, and displays the selected file on a full screen by using a moving-image dedicated player.

To play a plurality of moving images captured in the same time and space, those moving images are separately played regardless of the time and space information. For this reason, when the user desires to view the moving images, all of them have to be played, which requires a time proportional to the number of moving-image files, N, hindering the user's utilization of those images in practice Moreover, when capturing start, end, and play times of the plurality of moving images are different, it is impossible to play the moving images as one group without separately editing them.

Therefore, a need exists for a moving-image playing apparatus and a method for playing a plurality of moving images as one moving image.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a moving-image playing apparatus and a method for playing a plurality of moving images as one moving image.

Another aspect of the present invention is to provide a moving-image playing apparatus and a method for playing a plurality of moving images captured in the same time and space as if a user views one moving image in real time, without a need to edit them into one moving image.

In accordance with an aspect of the present invention, an apparatus for playing a plurality of moving images at a terminal is provided. The apparatus includes a display unit for playing the plurality of moving images as one moving image and a controller for connecting the plurality of moving images through connection information for a respective one of the plurality of moving images to play the plurality of moving images as one moving image.

In accordance with another aspect of the present invention, an apparatus for playing a plurality of moving images at a server is provided. The apparatus includes a controller for connecting or converting the plurality of moving images as or into one moving image through connection information for a respective one of the plurality of moving images, and for performing a control operation to sequentially transmit the plurality of moving images according to the connection information in a streaming manner to a terminal, and a transmitter for sequentially transmitting the plurality of moving images in the streaming manner to the terminal.

In accordance with another aspect of the present invention, a method for playing a plurality of moving images at a terminal is provided. The method includes accessing a server to receive and store the plurality of moving images corresponding to conditions and connecting the plurality of moving images through connection information for a respective one of the plurality of moving images to play the plurality of moving images as one moving image.

In accordance with another aspect of the present invention, a method for playing a plurality of moving images at a server is provided. The method includes connecting or converting the plurality of moving images as or into one moving image through connection information for a respective one of the plurality of moving images and sequentially transmitting the plurality of moving images according to the connection information in a streaming manner to a terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

DETAILED DESCRIPTION OF EXEMPLARY EMBODIMENTS

Figure 1:
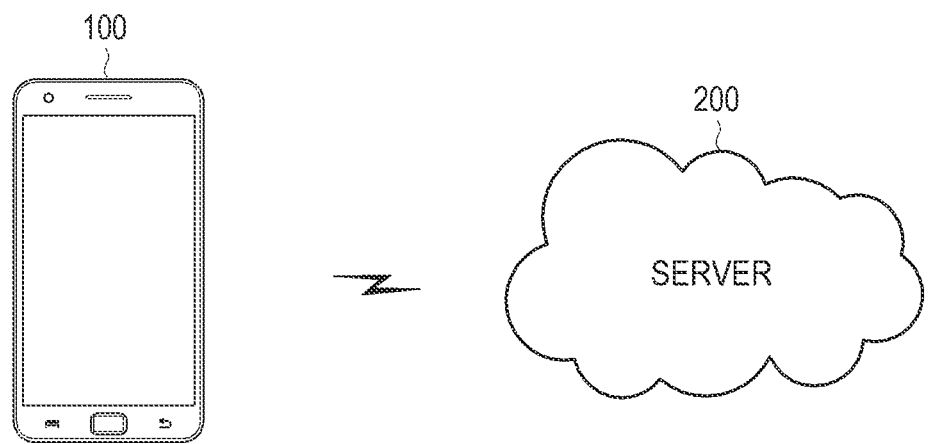
FIG. 1 is a diagram illustrating a moving-image playing system according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A terminal according to an exemplary embodiment of the present invention may include a portable terminal and a fixed terminal. Herein, the portable terminal is an electronic device which can be easily carried, such as a video phone, a cellular phone, a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic-book (E-book), a portable computer (e.g., a notebook, a tablet, and the like), a digital camera, or the like. The fixed terminal may be a desktop personal computer, and the like.

FIGS. 1 through 14, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a diagram illustrating a moving-image playing system according to an exemplary embodiment of the present invention.

Referring to FIG. 1, the moving-image playing system for playing a plurality of moving images as one moving image may include a terminal 100 and a server 200.

The terminal 100, in its play mode, receives and downloads a plurality of moving images corresponding to conditions from the server 200, extracts connection information for a respective one of the plurality of moving images, and plays the plurality of moving images connected through the connection information as one moving image. The corresponding conditions may include a theme, a time, a position, and the like.

The terminal 100, in its streaming play mode, accesses the server 200 to request the playing of the plurality of moving images corresponding to the conditions, and plays the plurality of moving images as one moving image through the plurality of moving images and play information received from the server 200. The structure of the terminal 100 will be described with reference to FIG. 2.

The server 200 extracts and provides the plurality of moving images corresponding to the conditions, requested from the terminal 100 in the play mode of the terminal 100.

The server 200 extracts the plurality of moving images corresponding to the conditions requested from the terminal 100 in the streaming play mode, generates play information for playing the plurality of moving images as one moving image, and transmits the play information and the plurality of moving images to the terminal 100. The structure of the server 200 will be described with reference to FIG. 3.

Figure 2:
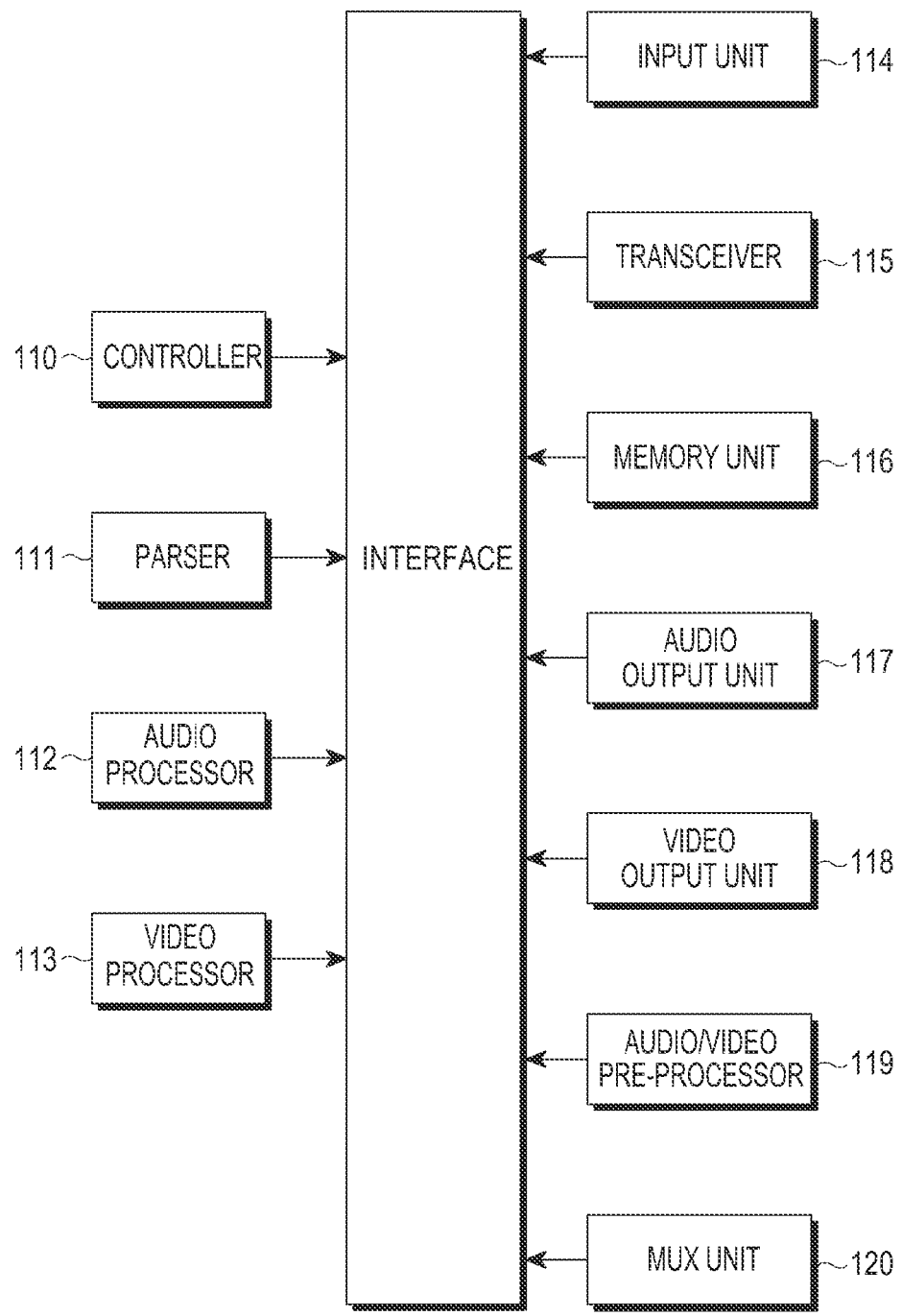
FIG. 2 is a block diagram of a terminal according to an exemplary embodiment of the present invention.

FIG. 2 is a block diagram of a terminal according to an exemplary embodiment of the present invention.

Referring to FIG. 2, the terminal may include a controller 110, a parser 111, an audio processor 112, a video processor 113, an input unit 114, a transceiver 115, a memory unit 116, an audio output unit 117, a video output unit 118, an audio/video pre-processor 119, and a multiplexing (MUX) unit 120.

The controller 110 controls the overall operation of the terminal 100. In the play mode of the terminal, the controller 110 accesses the server 200, receives a plurality of moving images corresponding to conditions, stores the received plurality of moving images in the memory unit 116, connects the plurality of moving images based on connection information for a respective one of the plurality of moving images, and plays the plurality of moving images as one moving image.

The controller 110 generates a playlist including the plurality of moving images and the connection information for a respective one of the plurality of moving images. The connection information includes capture time information and capture position information which are extracted from a respective one of the plurality of moving images. In an exemplary embodiment of the present invention, the capture time information is moving-image capture time information and is stored as absolute time information in a corresponding moving image through Global Positioning System (GPS) information, base station information, and the like. The capture position information is position information regarding a position in which a corresponding moving image is captured, and may be stored as position information of the corresponding moving image through GPS information, base station position information, Wi-Fi Access Point (AP) position information, and the like. The controller 110, after generating the playlist for the plurality of moving images, calculates a total play time for the plurality of moving images using Equation (1):

$$\text{Total Play Time} = \text{End Time} - \text{Start Time} - N \text{ Durations} \quad (1),$$

wherein "end time" indicates a play end time point of a moving image having the latest play end time among a plurality of moving images, "start time" indicates a play start time point of a moving image having the earliest play start time point among a plurality of moving images, and "N durations" indicates a time of discontinuous durations generated in the plurality of moving images or between moving images.

When the playing of the plurality of moving images is selected, the controller 110 plays the plurality of moving images as one moving image on a main screen of the display unit in an order that the plurality of moving images are connected based on the connection information. Thereafter, the controller 110 displays a current play time point of a moving image currently played on the main screen through a main progressive bar, plays a corresponding moving image including the current play time point displayed on the main progressive bar in its play time on a corresponding sub screen, and displays a current time point of the moving image currently played on the corresponding sub screen through a sub progressive bar. The controller 110, while playing a corresponding moving image on the main screen, may sequentially display thumbnail images on a respective one of the plurality of sub screens.

During the playing of the corresponding moving image on the main screen, if there is a discontinuous duration in the currently-played moving image, the controller 110 determines whether there is another moving image including the discontinuous duration in its play time. If there is another moving image including the discontinuous duration in its play time, the controller 110 plays the other moving image including the discontinuous duration in its play time in that discontinuous duration, and upon completion of the discontinuous duration, the controller 110 plays the corresponding moving image. The controller 110 plays the other moving image including the discontinuous duration in its play time, and upon completion of the playing of the other moving image, the controller 110 plays the corresponding moving image.

During the playing of the corresponding moving image on the main screen, if there is a discontinuous duration in the currently-played moving image, the controller 110 determines whether there is another moving image including the discontinuous duration in its play time. Unless there is another moving image including the discontinuous duration in its play time, the controller 110 plays another moving image, which is temporally closest in a play progress direction, in that discontinuous duration, and upon completion of the discontinuous duration, the controller 110 plays the corresponding moving image. Alternatively, the controller 110 may play another moving image including the discontinuous duration in its play time, and upon completion of the playing of the other moving image, the controller 110 may play the corresponding moving image.

During the playing of the corresponding moving image on the main screen, if there is a discontinuous duration in the currently played moving image during the playing of the moving image on the main screen, the controller 110 determines whether there is another moving image including the discontinuous duration in its play time. Unless there is another moving image including the discontinuous duration in its play time, the controller 110 skips the discontinuous duration to play the corresponding moving image from completion of the discontinuous duration. Upon completion of the playing of the corresponding moving image on the main screen, the controller 110 determines if there is another moving image including a play completion time point of the corresponding moving image in its play time. If there is another moving image including the play completion time point in its play time, the controller 110 plays the other moving image including the play completion time point in its play time. Unless there is another moving image including the play completion time point in its play time, the controller 110 may play another moving image which is temporally closest in a play progress direction.

When a change of a corresponding moving image currently played on the main screen is selected, the controller 110 plays the selected moving image from a current play time point displayed in the main progressive bar, and plays on a corresponding sub screen, the moving image played on the main screen before the selection.

Alternatively, when a change of a moving image currently played on the main screen is selected, the controller 110 plays a moving image played on a selected corresponding sub screen from a current play time point displayed in the main progressive bar and plays the corresponding moving image on the selected corresponding sub screen. The moving image on the main screen may be changed through selection or drag with respect to the left and right screens or upper and lower screens with respect to the center of the main screen, or the moving image on the main screen may be changed through selection of a corresponding sub screen.

The controller 110 sequentially displays a still image corresponding to a current play time point for a respective one of the plurality of moving images included in the playlist during generation of a drag from left to right, from right to left, from upper to lower, or from lower to upper on the main screen. If generation of the drag has completed during display of a still image corresponding to the current play time point for a respective one of the plurality of moving images, the controller 110 connects a moving image corresponding to a still image displayed at a time at which generation of the drag has completed to a moving image of the main screen and successively plays the moving image.

For example, when five moving images are included in a playlist and one main screen and four sub screens A through D exist on the display unit, the controller 110 plays one moving image on the main screen and the remaining four moving images on the respective four sub screens A through D. Once the sub screen A among the four sub screens is selected, the controller 110 plays a moving image of the sub screen A on the main screen and plays the moving image currently played on the main screen on the sub screen A, thereby switching the main screen with the corresponding sub screen A.

However, if five moving images are included in the playlist and one main screen and five sub screens A through E exist on the display unit, the controller 110 plays one moving image on the main screen and the five moving images included in the playlist (i.e., including the moving image currently played on the main screen) on the five sub screens A through E, respectively. If the sub screen A is selected from the five sub screens, the controller 110 plays a moving image of the sub screen A on the main screen, and keeps playing the corresponding moving image on the sub screen A to play the moving image which is the same as that played on the main screen.

During the playing of the corresponding moving images on the main screen and the respective one of a plurality of sub screens, if a particular gesture, e.g., a double touch, is generated on a screen, the controller 110 may change the main screen into a full screen to play a corresponding moving image. Alternatively, if a particular gesture for change into the full screen, a double touch, is generated on the main screen, the controller 110 changes the main screen into the full screen to play a corresponding moving image, and when the double touch is generated on a corresponding sub screen among the plurality of sub screens, the controller 110 changes a sub screen into the full screen to play a corresponding moving image.

In a single audio mode, the controller 110 maintains audio output set by default even when a moving image played on the main screen is changed.

When storage of the plurality of moving images is selected after completion of the playing of the plurality of moving images, the controller 110 stores the plurality of moving images as one moving image in an order that they are played. Alternatively, when storage of the plurality of moving images is selected before start of the playing of the plurality of moving images, the controller 110 encodes the plurality of moving images into one moving image in an order that they are played, simultaneously with the playing of the plurality of moving images, and upon completion of the playing of the plurality of moving images, the controller 110 stores the encoded one moving image.

In the streaming play mode, the controller 110 accesses the server 200 to request a plurality of moving images corresponding to conditions input by a user. Thereafter, the controller 110 receives from the server 200, display information capable of displaying a main screen for playing the plurality of moving images as one moving image, a main progressive bar for displaying a total play time for the plurality of moving images played on the main screen, a plurality of sub screens for playing a respective one of the plurality of moving images, and a plurality of sub main bars for displaying a total play time of a corresponding moving image played on a respective one of the plurality of sub screens, and displays the main screen, the main progressive bar, the plurality of sub screens, and the plurality of sub progressive bars on the display unit.

Once the controller 110 requests the server 200 to play the plurality of moving images, the controller 110 receives and plays respective moving images to be played on the main screen and the plurality of sub screens in a streaming manner. The controller 110, while receiving and playing a corresponding moving image on the main screen in a streaming manner from the server 200, may sequentially receive and display a thumb nail image to be displayed on a respective one of the plurality of sub screens from the server 200. Once the controller 110 requests the server 200 to change a corresponding moving image on the main screen, the controller 110 may receive and play a selected moving image on the main screen and receive and play a moving image, which was played on the main screen, on a corresponding sub screen where the selected moving image was played.

In the play mode of the terminal, the parser 111 parses capture time, a capture position, and other information from position information for a respective one of the plurality of moving images, and transmits connection information including the capture time and the capture position to the controller 110.

The audio processor 112 includes an audio codec for processing an audio signal, such as a voice, and performs encoding or decoding with respect to the audio signal through the audio codec.

The video processor 113 includes a data codec for processing a data signal, and performs encoding or decoding with respect to a video signal through the data codec.

The input unit 114 includes keys for inputting numeric and character information and function keys for setting various functions.

The transceiver 115 receives a plurality of moving images transmitted from the server 200 in the terminal's play mode. In the streaming play mode, the transceiver 115 transmits a command and a corresponding moving image list requested by the terminal to the server 200 and receives a plurality of moving images in a streaming manner from the server 200.

The memory unit 116 may include program and data memories. The program memory stores programs for controlling a general operation of the terminal and the data memory temporarily stores data generated during execution of the programs.

The memory unit 116 stores a plurality of moving images which may be classified to correspond to conditions (i.e., a particular time and position).

The video output unit 118 is a display unit which displays user data output from the controller 110. Herein, the display unit may use a Liquid Crystal Display (LCD), and in this case, the display unit may include an LCD controller, a memory capable of storing image data, an LCD element, and the like. When the LCD is implemented with a touch screen, it may serve as an input unit, and in this case, keys, such as the input unit 114, may be displayed on the display unit.

The display unit may display a main screen for playing the plurality of moving images as one moving image, a main progressive bar for displaying a total play time for the plurality of moving images played on the main screen, a plurality of sub screens for playing a respective one of the plurality of moving images, and a plurality of sub progressive bars for displaying a total play time of a corresponding moving image played on a respective one of the plurality of sub screens.

The audio/video pre-processor 119, configured to store the plurality of moving images played as one moving image as a new moving image file, processes image resolution and audio sampling rate of a respective one of the plurality of moving images into the same format, and transmits the processing result to the audio processor 112 and the video processor 113 to perform encoding.

The MUX unit 120 makes the plurality of moving images processed in the same format by the audio/video pre-processor 119 into a single file format.

Figure 3:
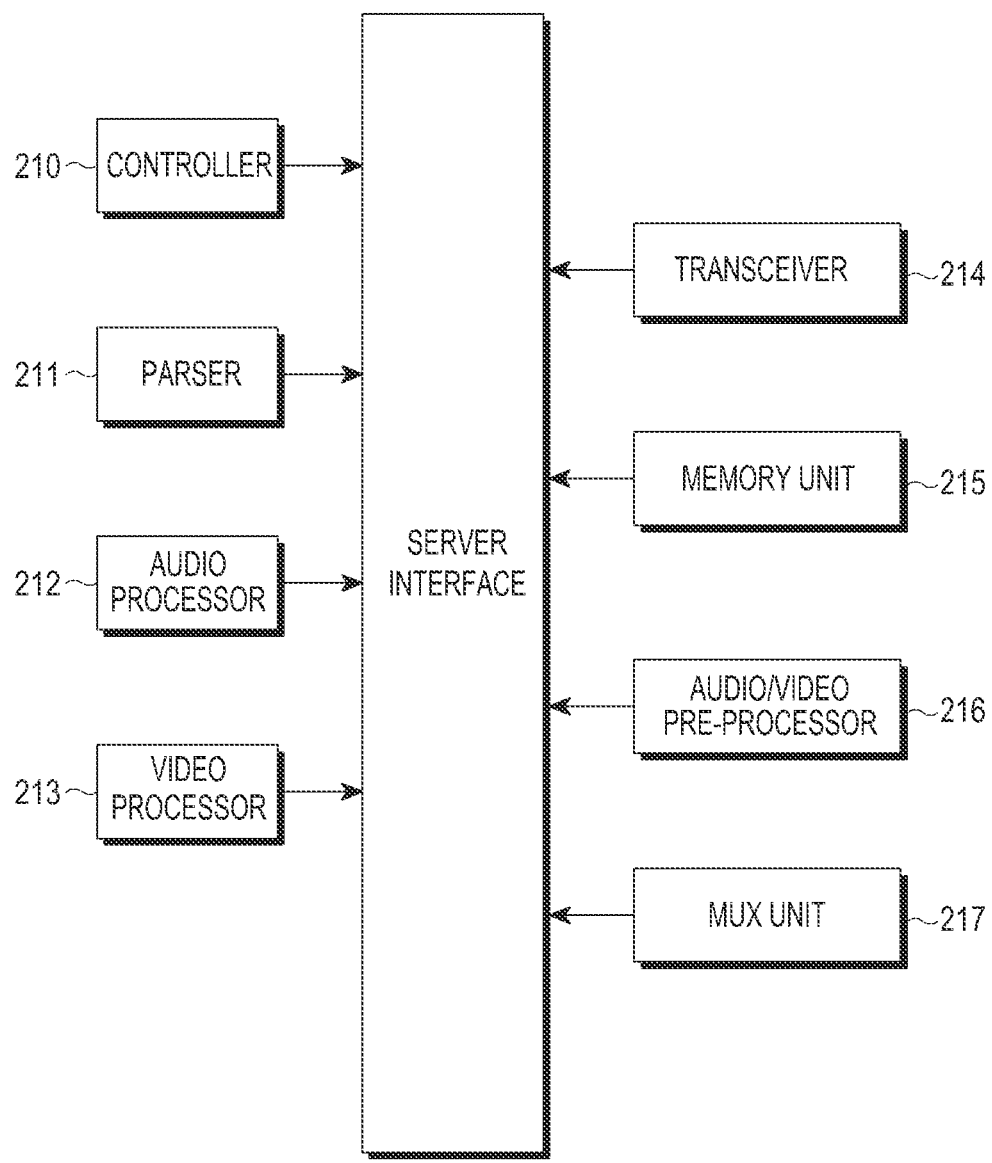
FIG. 3 is a block diagram of a server according to an exemplary embodiment of the present invention.

FIG. 3 is a block diagram of a server according to an exemplary embodiment of the present invention.

Referring to FIG. 3, the server 200 may include a controller 210, a parser 211, an audio processor 212, a video processor 213, a transceiver 214, a memory unit 215, an audio/video pre-processor 216, and a MUX unit 217.

The controller 210 controls the overall operation of the server 200. In the streaming play mode, the controller 210 extracts a plurality of moving images corresponding to conditions requested by the accessing terminal 100 from the memory unit 215, connects the plurality of moving images based on connection information for a respective one of the plurality of moving images, and sequentially transmits the plurality of moving images to the terminal 100 in a streaming manner according to the connection information.

The controller 210 transmits to the terminal, display information capable of displaying a main screen for playing the plurality of moving images as one moving image, a main progressive bar for displaying a total play time for the plurality of moving images played on the main screen, a plurality of sub screens for playing a respective one of the plurality of moving images, and a plurality of sub main bars for displaying a total play time for a corresponding moving image played on a respective one of the plurality of sub screens.

The controller 210 generates a playlist including the plurality of moving images and the connection information for a respective one of the plurality of moving images, and the connection information includes capture time information and capture position information which are extracted from a respective one of the plurality of moving images.

The controller 210, after generating the playlist for the plurality of moving images, calculates a total play time for the plurality of moving images using Equation 1.

When the playing of the plurality of moving images is requested from the terminal 100, the controller 210 sequentially transmits a plurality of moving images to be played on the main screen of the display unit of the terminal in a streaming manner according to the connection information, and transmits a plurality of moving images played on a plurality of sub screens in a streaming manner.

During transmission of a corresponding moving image to be played on the main screen of the terminal, if there is a discontinuous duration in the corresponding moving image, the controller 210 determines whether there is another moving image including the discontinuous duration in its play time. If there is another moving image including the discontinuous duration in its play time, the controller 210 transmits the other moving image including the discontinuous duration in its play time in that discontinuous duration, and upon completion of the discontinuous duration, the controller 210 transmits the corresponding moving image. Alternatively, the controller 210 may transmit the other moving image including the discontinuous duration in its play time, and upon completion of the playing of the other moving image, the controller 210 may transmit the corresponding moving image.

During transmission of a corresponding moving image to be played on the main screen of the terminal 100, if there is a discontinuous duration in the corresponding moving image, the controller 210 determines whether there is another moving image including the discontinuous duration in its play time. Unless there is another moving image including the discontinuous duration in its play time, the controller 210 transmits another moving image which is temporally closest in a play progress direction in that discontinuous duration, and upon completion of the discontinuous duration, the controller 210 transmits the corresponding moving image. Alternatively, the controller 210 transmits another moving image including the discontinuous duration in its play time, and upon completion of the playing of the other moving image, the controller 210 transmits the corresponding moving image.

During transmission of a corresponding moving image to be played on the main screen of the terminal 100, if there is a discontinuous duration in the corresponding moving image, the controller 210 determines whether there is another moving image including the discontinuous duration in its play time. Unless there is another moving image including the discontinuous duration in its play time, the controller 210 skips the discontinuous duration and transmits the moving image from an end point of the discontinuous duration.

Upon completion of the playing of a corresponding moving image on the main screen of the terminal 100, the controller 210 determines whether there is another moving image including a play completion time point of the corresponding moving image in its play time. If there is another moving image including the play completion time point in its play time, the controller 210 transmits the other moving image including the play completion time point in its play time. Unless there is another moving image including the play completion time point in its play time, the controller 110 transmits another moving image which is temporally closest in the play progress direction.

When a change of a moving image played on the main screen is requested from the terminal, the controller 210 transmits the selected moving image as a moving image of the main screen, and transmits a moving image, which was played on the main screen prior to the selection, as a moving image of a corresponding sub screen. The controller 210 may change a moving image of the main screen through selection or drag with respect to the left and right screens or upper and lower screens with respect to the center of the main screen, or may transmit change information capable of changing a moving image of the main screen to the terminal 100 through selection of a corresponding sub screen.

In the single audio mode, the controller 210 transmits audio information maintaining audio output set by default to the terminal 100 when a moving image played on the main screen of the terminal is changed. In the single audio mode, if there is a discontinuous duration in the audio output set by default, the controller 210 transmits audio information of a currently played moving image to the terminal 100.

When storage of the plurality of moving images is requested by the terminal 100 after completion of the playing of the plurality of moving images in the terminal 100, the controller 110 generates the play information including storage information capable of storing the plurality of moving images as one moving image in an order that they are played, and transmits the play information to the terminal 100.

In the play mode of the terminal 100, the controller 210 extracts a plurality of moving images corresponding to conditions requested by the accessing terminal 100 and transmits the plurality of moving images to the terminal 100.

In the streaming play mode, the parser 211 parses capture time, capture position, and other information from position information for a respective one of the plurality of moving images, and transmits connection information including the capture time and capture position to the controller 210.

The audio processor 212 includes an audio codec for processing an audio signal, such as a voice, and the like, and performs encoding or decoding with respect to the audio signal through the audio codec.

The video processor 213 includes a data codec for processing a data signal and performs encoding or decoding with respect to a video signal through the data codec.

The transceiver 214 includes a receiver for receiving a command of the terminal 100, and a transmitter for sequentially transmitting the plurality of moving images to the terminal 100 according to connection information.

The memory unit 215 may include program and data memories. The program memory stores programs for controlling a general operation of the server and the data memory temporarily stores data generated during execution of the programs.

The memory unit 215 stores a plurality of moving images which may be classified to correspond to conditions (i.e., a particular time and position).

The audio/video pre-processor 216, configured to store a plurality of moving images played as one moving image as a new moving image file, processes image resolution and audio sampling rate of a respective one of the plurality of moving images into the same format, and transmits the processing result to the audio processor 212 and the video processor 213 to perform encoding.

The MUX unit 217 makes the plurality of moving images processed in the same format by the audio/video pre-processor 216 into a single file format.

A moving-image play operation in the foregoing terminal or server will be described with reference to FIGS. 4 through 14.

Figure 4:
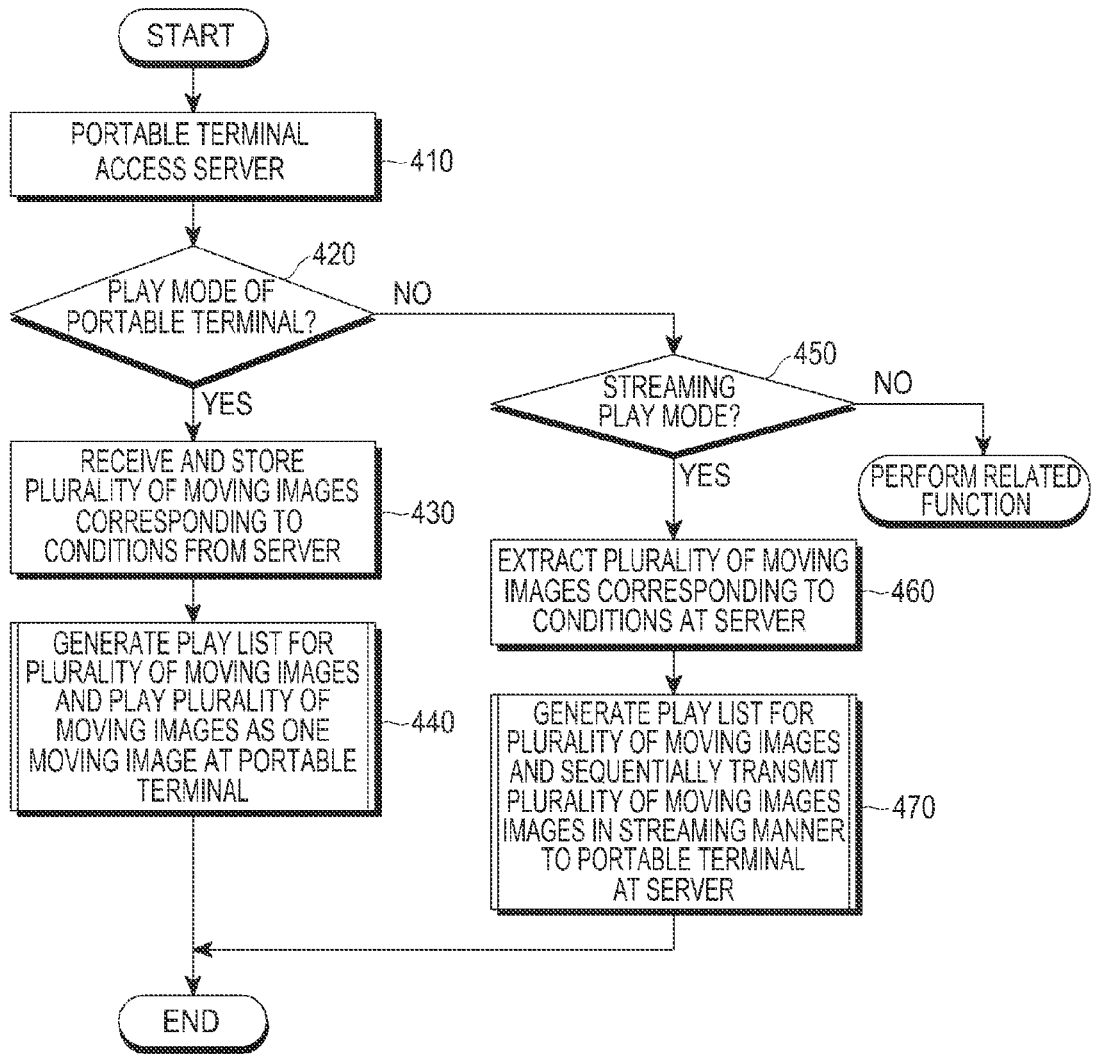
FIG. 4 is a flowchart illustrating a play mode selection process for playing a plurality of moving-images according to an exemplary embodiment of the present invention.
Figure 5A:
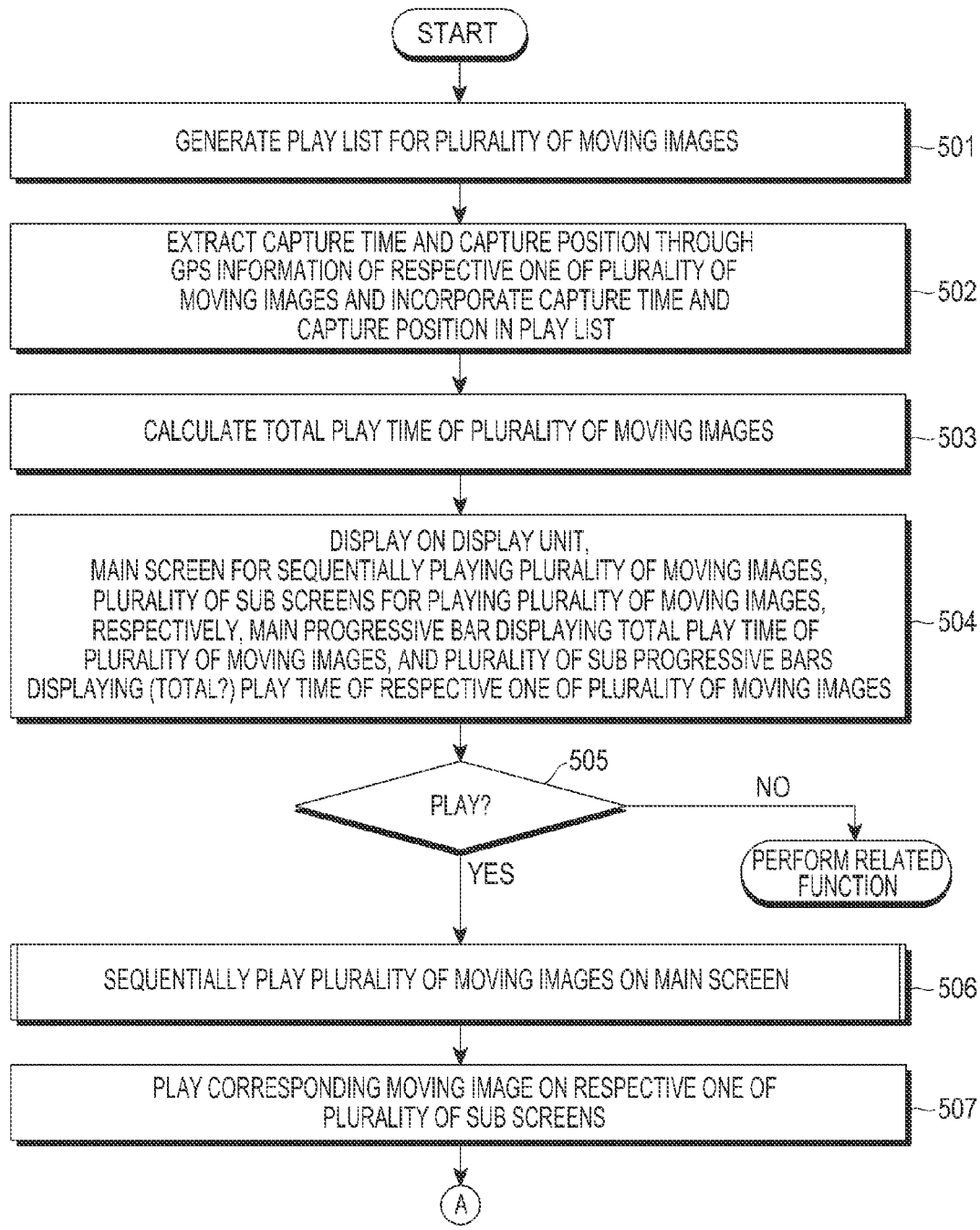
FIGS. 5A and 5B are flowcharts illustrating a process of playing a plurality of moving images in a play mode of a terminal according to an exemplary embodiment of the present invention.
Figure 5B:
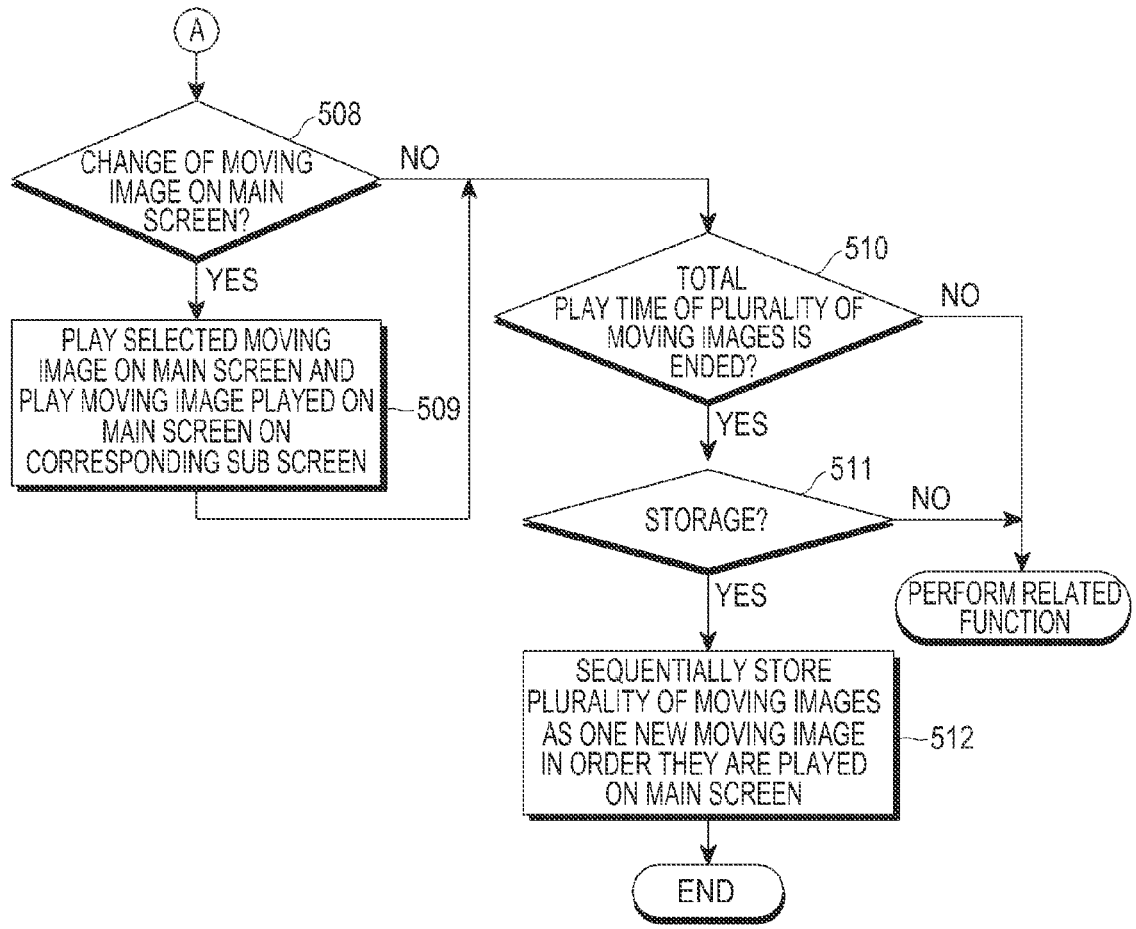
Figure 6:
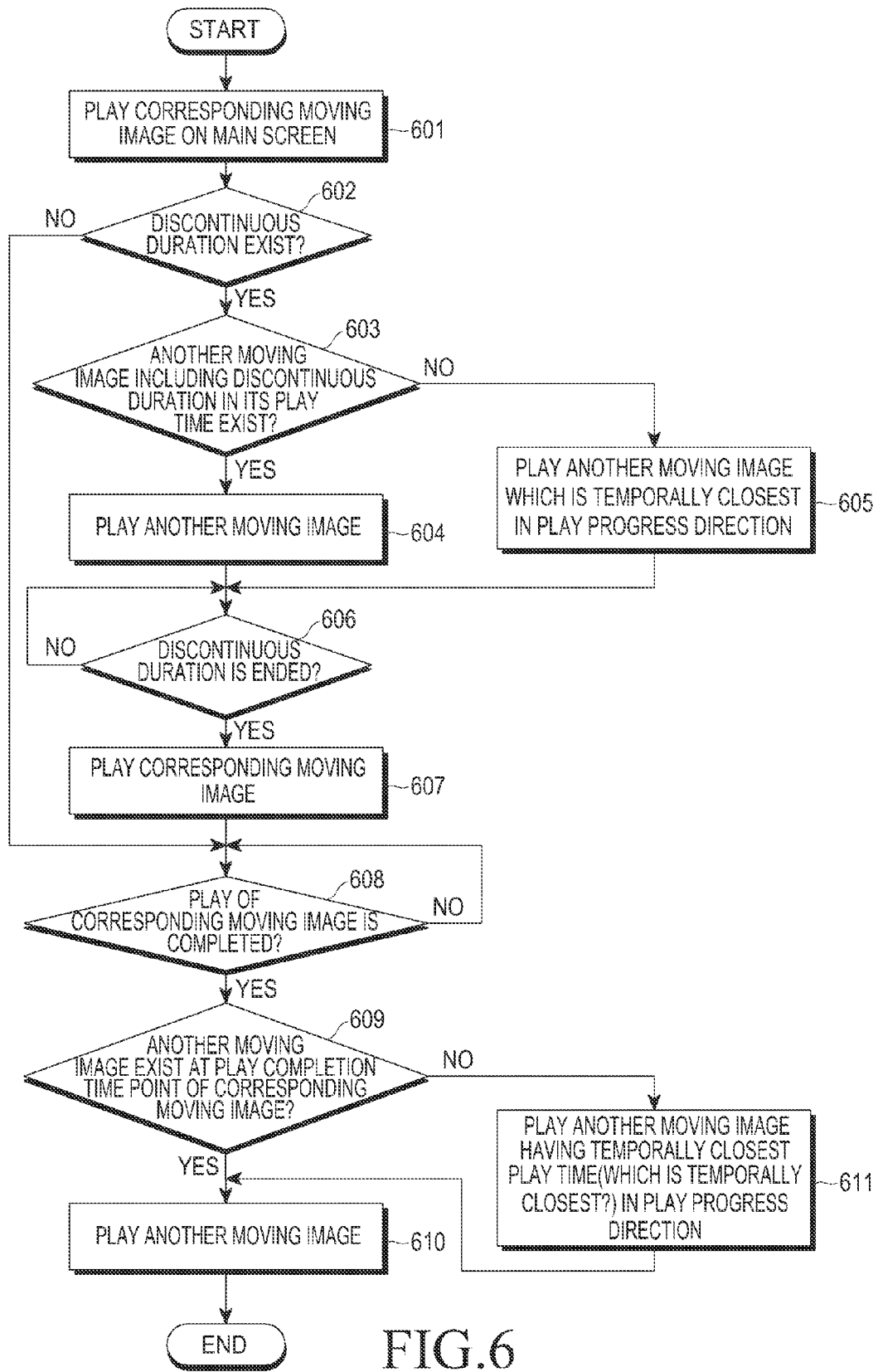
FIG. 6 is a flowchart illustrating a process of sequentially playing a plurality of moving images on a main screen according to an exemplary embodiment of the present invention.
Figure 7A:
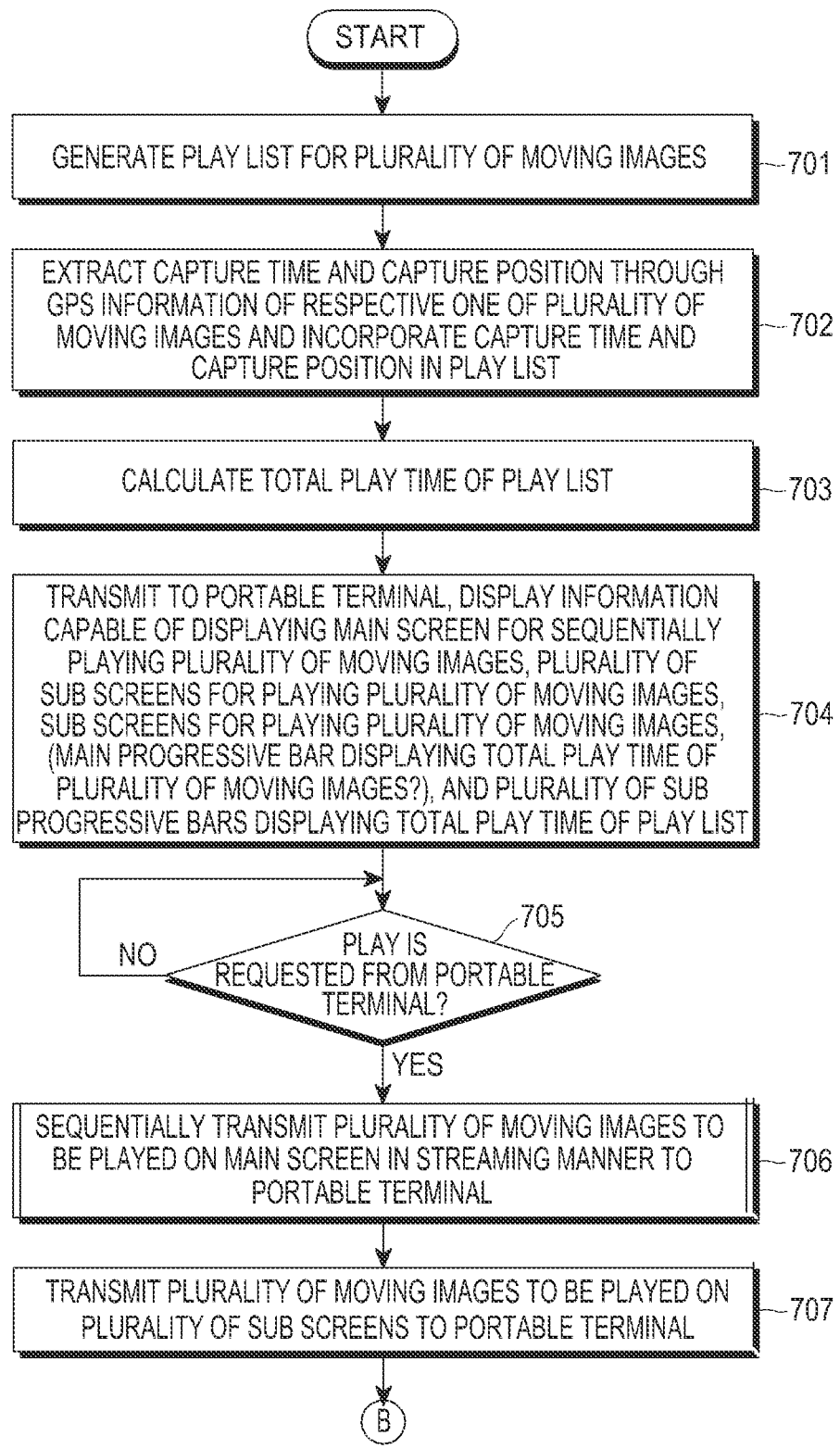
FIGS. 7A and 7B are flowcharts illustrating a process of playing a plurality of moving images in a streaming play mode according to an exemplary embodiment of the present invention.
Figure 7B:
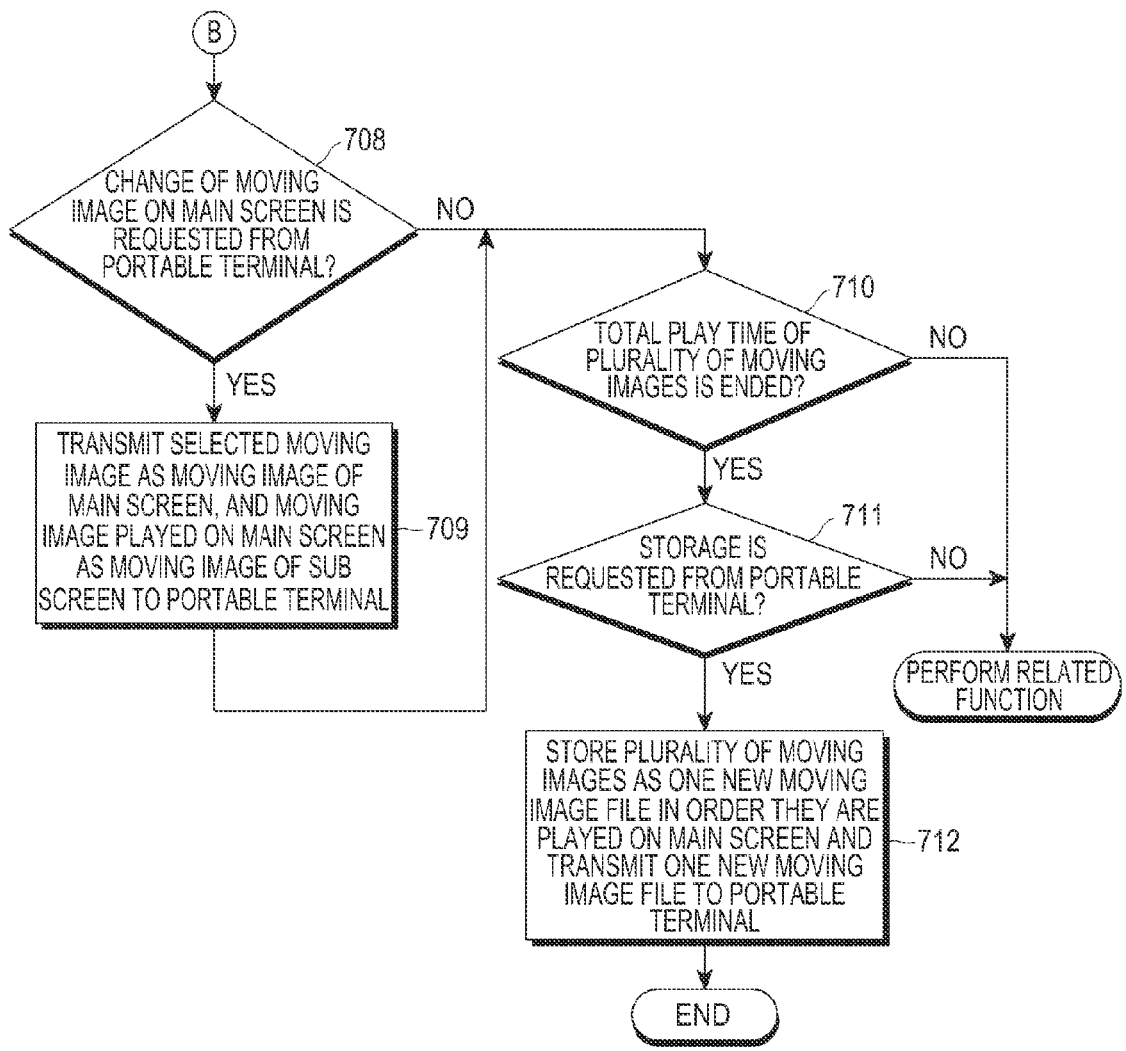
Figure 8:
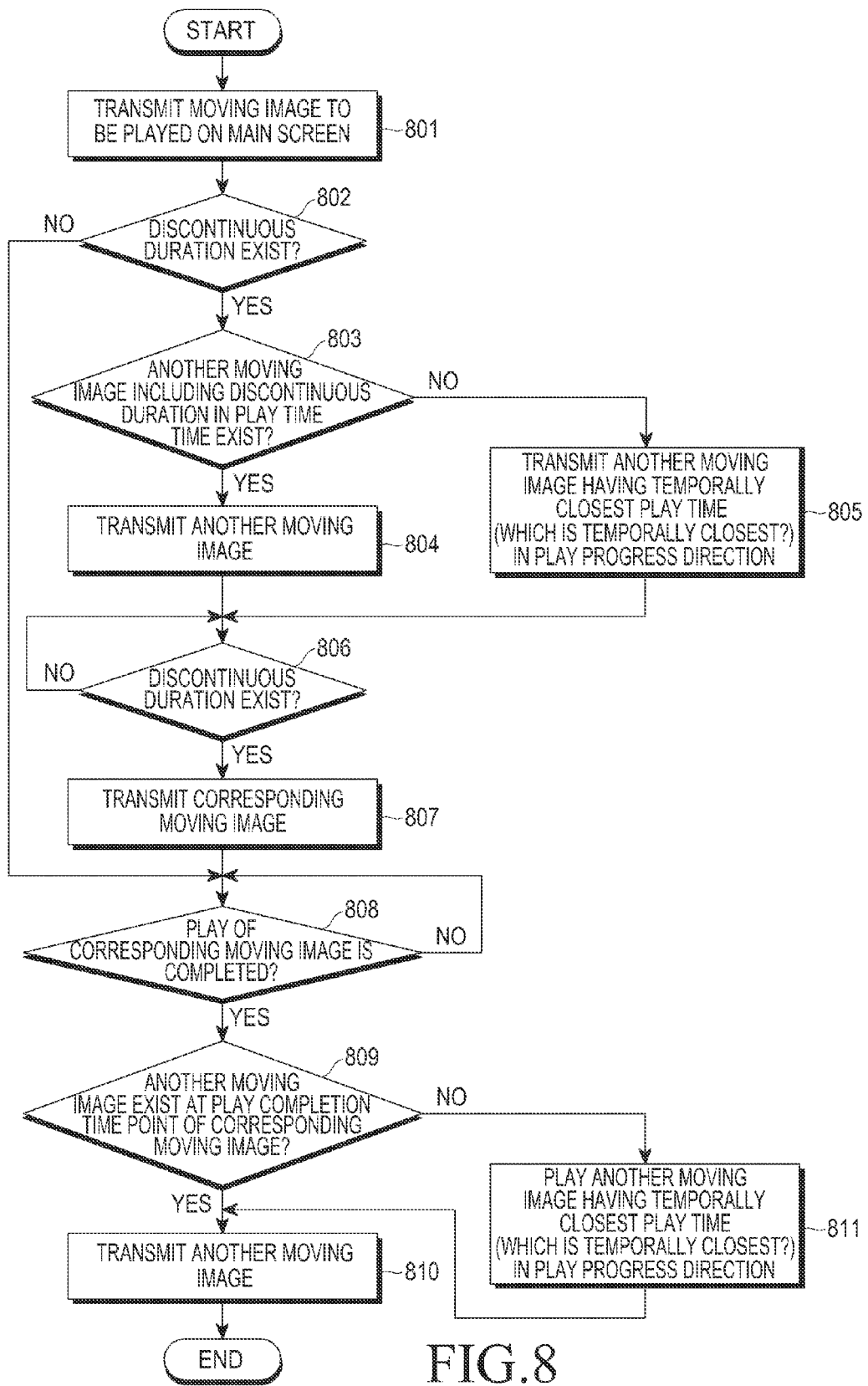
FIG. 8 is a flowchart illustrating a process of sequentially playing a plurality of moving images on a main screen according to an exemplary embodiment of the present invention.

FIG. 4 is a flowchart illustrating a play mode selection process for playing a plurality of moving-images according to an exemplary embodiment of the present invention, FIGS. 5A and 5B are flowcharts illustrating a process of playing a plurality of moving images in a play mode of a terminal according to an exemplary embodiment of the present invention, FIG. 6 is a flowchart illustrating a process of sequentially playing a plurality of moving images on a main screen according to an exemplary embodiment of the present invention, FIGS. 7A and 7B are flowcharts illustrating a process of playing a plurality of moving images in a streaming play mode according to an exemplary embodiment of the present invention, FIG. 8 is a flowchart illustrating a process of sequentially playing a plurality of moving images on a main screen according to an exemplary embodiment of the present invention, and FIGS. 9 through 14 are diagrams illustrating a moving-image playing system according to exemplary embodiments of the present invention.

Referring to FIG. 4, in step 410 in which the terminal 100 accesses the server 200, if the play mode of the terminal is selected in the terminal, the controller 110 detects the selection in step 420, and requests a plurality of moving images corresponding to conditions (i.e., a particular time and position) from the server 200, and receives and stores the plurality of moving images from the server 200 according to the request in step 430.

Alternatively, in the play mode of the terminal, the controller 110 may receive the plurality of moving images through wireless communication, such as Bluetooth and infrared communication, rather than from the server 200. For example, when a particular object is photographed at various angles by a plurality of terminals in the same place and at the same time, the plurality of terminals may share their respective captured moving images through wireless communication, such as Bluetooth and infrared communication.

The terminal generates a playlist for the plurality of moving images and plays the plurality of moving images as one moving image in step 440.

The terminal's operation of playing the plurality of moving images as one moving image in step 440 will be described with reference to FIGS. 5A through 6.

Referring to FIGS. 5A and 5B, the controller 110 of the terminal generates one playlist for a plurality of moving images in step 501. The controller 110 may automatically generate one playlist for a plurality of moving images when downloading the plurality of moving images from the server 200. Alternatively, the controller 110 stores the plurality of moving images downloaded from the server 200 in the memory unit 116, extracts a plurality of moving images corresponding to conditions input by the user or directly selected by the user, and generates one playlist for the plurality of moving images.

The parser 111 parses capture time, capture position, and other information from position information included in a respective one of the plurality of moving images, and once the parser 111 transmits the parsed information to the controller 110, the controller 110 incorporates connection information including capture time and capture position for a respective one of the plurality of moving images into the playlist in step 502.

Using Equation 1, the controller 110 calculates a total play time for the plurality of moving images in step 503.

Figure 10:
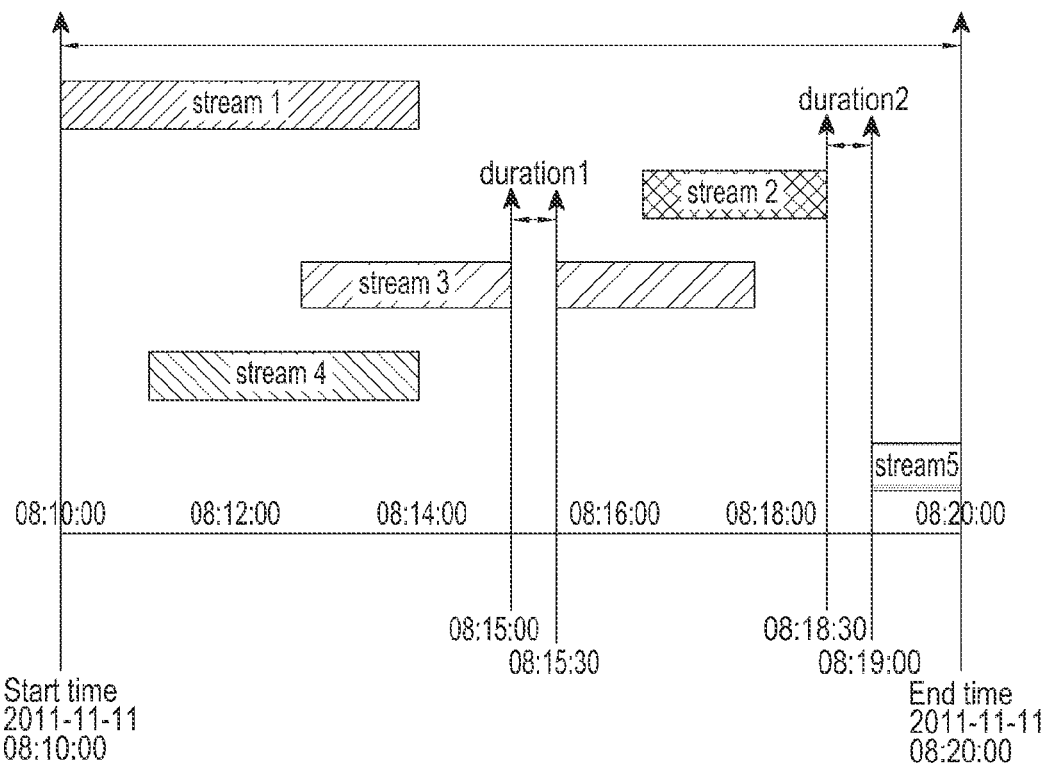

In step 503, the controller 110 extracts capture time information for each moving image registered in the playlist, sets a start time point of a moving image having the earliest start point of a play time to a start time, and sets a play end time point of a moving image having the latest end point of a play time to an end time. The controller 110 extracts a time (e.g., N durations) of a discontinuous duration of each moving image through discontinuity information included in each moving image registered in the playlist. The discontinuous duration means a predefined time during which capturing is stopped if during capturing of a moving image, the capturing is switched to a stop state and the capturing is resumed after the predefined time, or an empty duration during which any moving image is not played when the plurality of moving images are connected based on the connection information. For example, as shown in FIG. 10, "duration1" of a third moving image "stream 3" is a predefined time in which during capturing of the third moving image, the capturing is temporarily stopped, and indicates a discontinuous duration, and "duration2" is an empty duration during which any moving image is not played between a second moving image "stream 2" and a fifth moving image "stream 5" which are connected based on connection information, and indicates a discontinuous duration.

The controller 110 calculates a total play time for a plurality of moving images registered in the playlist using Equation 1.

In step 504, the controller 110 displays a main screen for playing the plurality of moving images as one moving image on the display unit, a main progressive bar for displaying a total play time of the plurality of moving images played on the main screen, a plurality of sub screens for playing a respective one of the plurality of moving images, and a plurality of sub main bars for displaying a total play time of a corresponding moving image played on a respective one of the plurality of sub screens.

Figure 9:
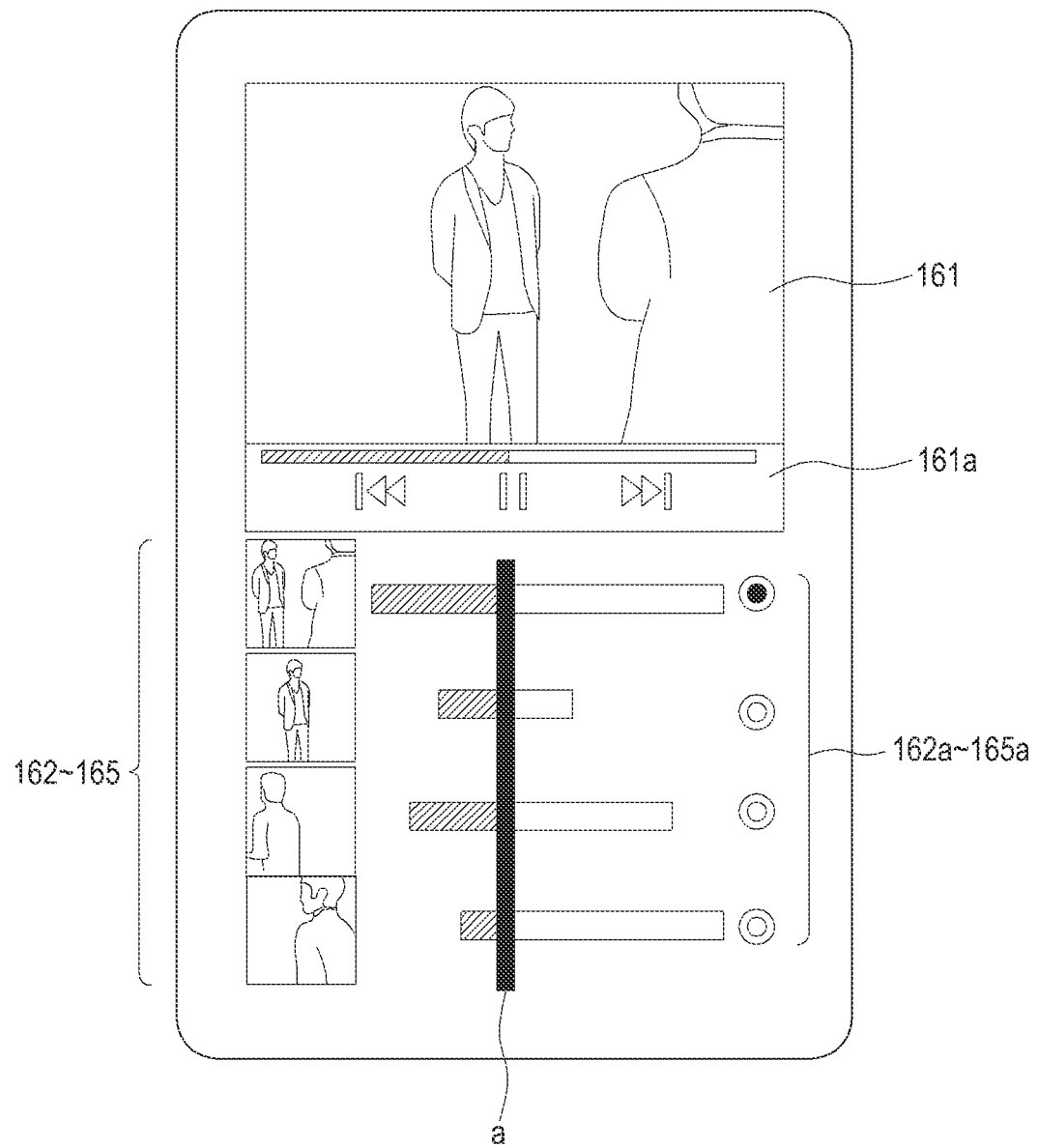
FIGS. 9 through 14 are diagrams illustrating a moving-image playing system according to exemplary embodiments of the present invention.

Referring to FIG. 9 to describe step 504, a main screen 161 and a plurality of sub screens 162 through 165 are displayed on the display unit, a main progressive bar 161a for displaying a total play time duration for a plurality of moving images sequentially played over time on the main screen 160 under the main screen 161 are displayed, and a plurality of sub progressive bars 162a through 165a for displaying a total play time duration for a corresponding moving image played on a corresponding sub screen are displayed to the right of a respective one of the plurality of sub screens 162 and 165.

The total play time duration displayed in a respective one of the plurality of sub progressive bars 162a through 165a is positioned and displayed in a corresponding play time duration with respect to the total play time displayed in the main progressive bar 161a.

The main progressive bar 161a and the plurality of sub progressive bars 162a through 165a interwork, such that when any one progressive bar moves, the other progressive bars all move together. Thus, once the main progressive bar 161a moves as a corresponding moving image is played on the main screen 161, the plurality of sub progressive bars 162a through 165a move together in parallel as indicated by "a".

In a search mode, the main progressive bar 161a and the plurality of sub progressive bars 162a through 165a move together in parallel.

During display of the main screen, the main progressive bar, the plurality of sub screens, and the plurality of sub progressive bars on the display unit in step 504, upon selection of play, the controller 110 detects the selection in step 505 and plays on the main screen, a plurality of moving images as one moving image in an order they are connected through the connection information in step 506. Step 506 will be described below with reference to FIG. 6.

At the same time, the controller 110 plays on a corresponding sub screen, a corresponding moving image, including a current play time point displayed in the main progressive bar in its play time, from among moving images displayed on the plurality of sub screens in step 507. In step 507, the controller 110 may sequentially play a corresponding moving image on a respective one of the plurality of sub screens according to a user's selection or in an order they are registered in the playlist. In addition, if a corresponding moving image on a corresponding sub screen has ended playing before completion of the playing of a moving image on the main screen, the controller 110 may display an arbitrary still image, e.g., the first scene or the last scene of a corresponding moving image, as a thumbnail image on the corresponding sub-screen.

Alternatively, the controller 110 may sequentially display a corresponding thumbnail image on a respective one of the plurality of sub screens during the playing of the corresponding moving image on the main screen, thereby displaying a thumbnail image refreshed at predefined time intervals, instead of playing a corresponding moving image on a respective one of the plurality of sub screens.

In addition, when a moving image played on the main screen is changed, the controller 110 may convert the moving image into the audio of the changed moving image and output the audio, or in the single audio mode, the controller 110 maintains the audio output having high priority selected by the user or set by default even when the moving image played on the main screen is changed. In the single audio mode, the controller 110 outputs audio having the next high priority if the audio output set by default has completed prior to completion of the playing of the moving image on the main screen. In the single audio mode, the controller 110 outputs audio of a currently played moving image if there is a discontinuous duration in the audio output set by default.

A process of sequentially playing the plurality of moving images as one moving image in an order they are connected through connection information on the main screen in step 506 will be described with reference to FIG. 6.

Referring to FIG. 6, in step 601 where a corresponding moving image among a plurality of moving images connected in a time order is played on the main screen, the controller 110 determines whether there is a discontinuous duration from discontinuity information included in the corresponding moving image. If a discontinuous duration exists in the corresponding moving image, the controller 110 detects the presence of the discontinuous duration in step 602 and determines whether there is in the playlist another moving image including a discontinuous duration of the corresponding moving image in its play time. If there is another moving image including a discontinuous duration of the corresponding moving image in its play time, the controller 110 detects the existence in step 603, and at a time position corresponding to the discontinuous duration during the playing of the corresponding moving image, the controller 110 plays the other moving image in step 604.

Figure 11:
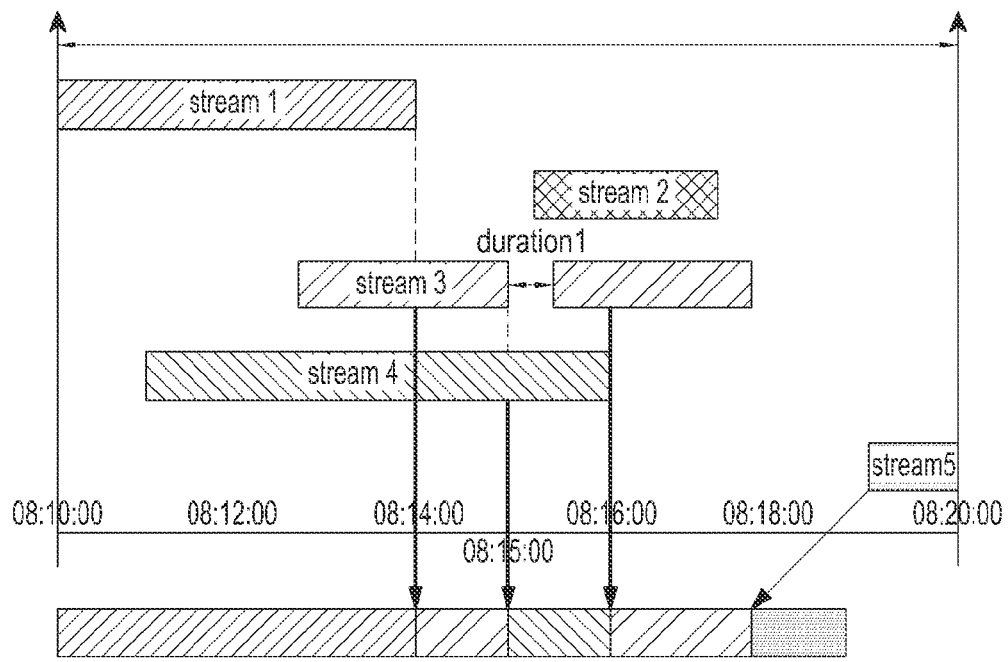

Steps 603 and 604 will be described with reference to FIG. 11 by way of example. If there is a discontinuous duration "duration1" of about 00:00:30 seconds at a position 08:15:00 during the playing of the third moving image "stream 3" on the main screen, the fourth moving image "stream 4" including the position 08:15:00 in its play time may be connected and successively played.

Alternatively, if there are a plurality of candidate groups including the discontinuous duration in their respective play times, a moving image captured in the closest distance in terms of a GPS distance is preferentially connected and played.

Alternatively, unless there is another moving image including the discontinuous duration of the corresponding moving image in its play time, the controller 110 detects the absence in step 603 and plays a moving image temporally closest in the play progress direction in step 605.

Alternatively, unless there is another moving image including the discontinuous duration of the corresponding moving image in its play time, the controller 110 skips the discontinuous duration to play the corresponding moving image from an end point of the discontinuous duration. Steps 603 and 605 will be described with reference to FIG. 12 by way of example. For example, during the playing of the third moving image "stream 3" on the main screen, in a case of existence of a discontinuous duration "duration1" for about 00:00:30 seconds at a time position 08:15:00, unless there is another moving image including the discontinuous duration of the third moving image in its play time, the second moving image "stream 2" in the closest time position 08:15:15 to the time position 08:15:00 is connected and successively played.

During the playing of the other moving image in the discontinuous duration of a corresponding moving image in step 604 or 605, if the discontinuous duration of the corresponding moving image has completed, the controller 110 detects the completion in step 606 and resumes the playing of the corresponding moving image in step 607.

Figure 13:
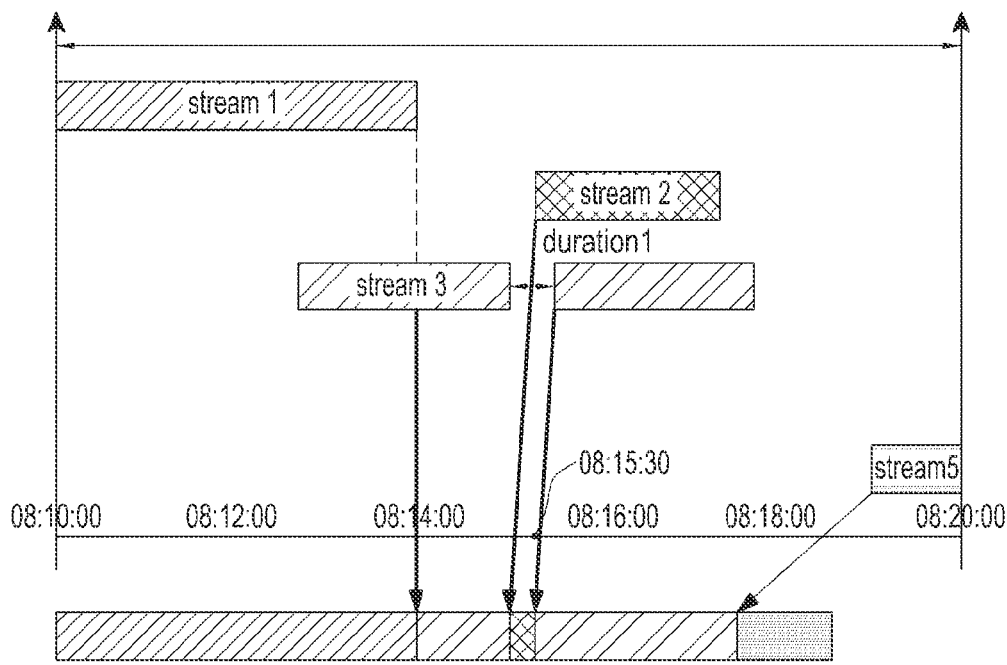

Steps 606 and 607 will be described with reference to FIG. 13 by way of example. The second moving image "stream 2" is played in the discontinuous duration "duration1" of the third moving image "stream 3", and the third moving image "stream 3" may be connected and successively played in a time position 08:15:30 at which the discontinuous duration "duration1" has completed.

Alternatively, during the playing of the other moving image in the discontinuous duration of the corresponding moving image in step 604 or 605, the controller 110 waits for completion of the playing of the other moving image currently played on the main screen, and upon completion of the playing of the other moving image, the controller 110 resumes the playing of the corresponding moving image.

Figure 12:
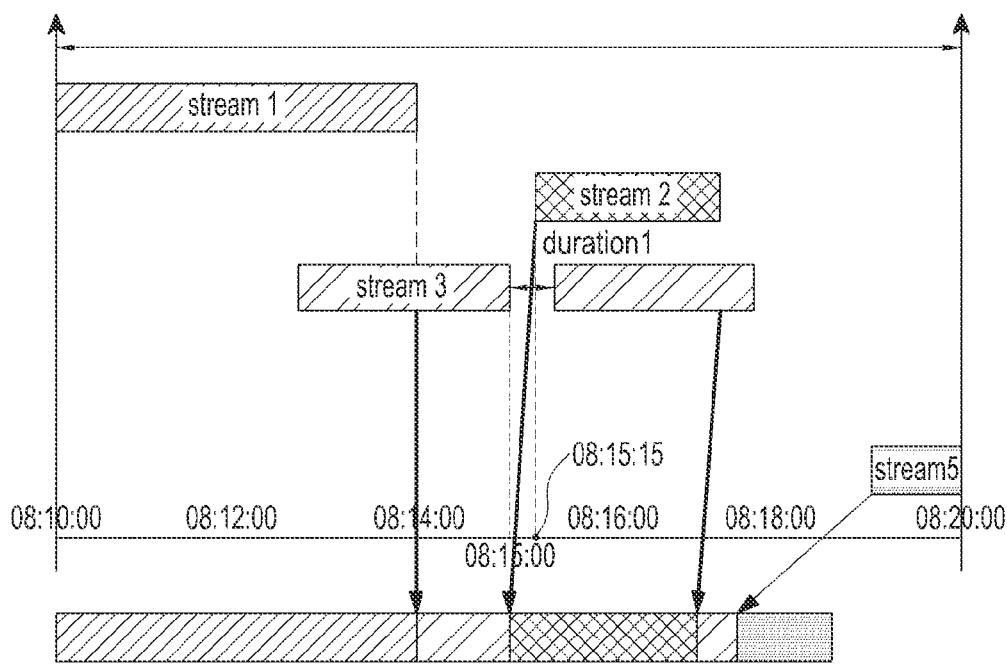

For example, as shown in FIG. 12, the second moving image "stream 2" is played in the discontinuous duration "duration1" of the third moving image "stream 3", and upon completion of the playing of the second moving image "stream 2", the third moving image "stream 3" is played from a play time point corresponding to a time point of completion of the playing of the second moving image "stream 2". If the third moving image "stream 3" has completed playing when the playing of the second moving image "stream 2" has completed, the next moving image connected through connection information is connected and successively played.

During the playing of the corresponding moving image on the main screen, if the corresponding moving image has completed playing in step 607, the controller 110 detects the completion in step 608 and determines whether there is another moving image including a play completion time point of the corresponding moving image in its play time or another moving image which includes the play completion time point of the corresponding moving image in its play time and is captured in the closest position from among the plurality of moving images included in the playlist.

If there is another moving image including the play completion time point of the corresponding moving image in its play time or another moving image which includes the play completion time point of the corresponding moving image in its play time, and is captured in the closest position, the controller 110 detects the existence in step 609 and connects to and successively plays the other moving image in step 610.

Figure 14:
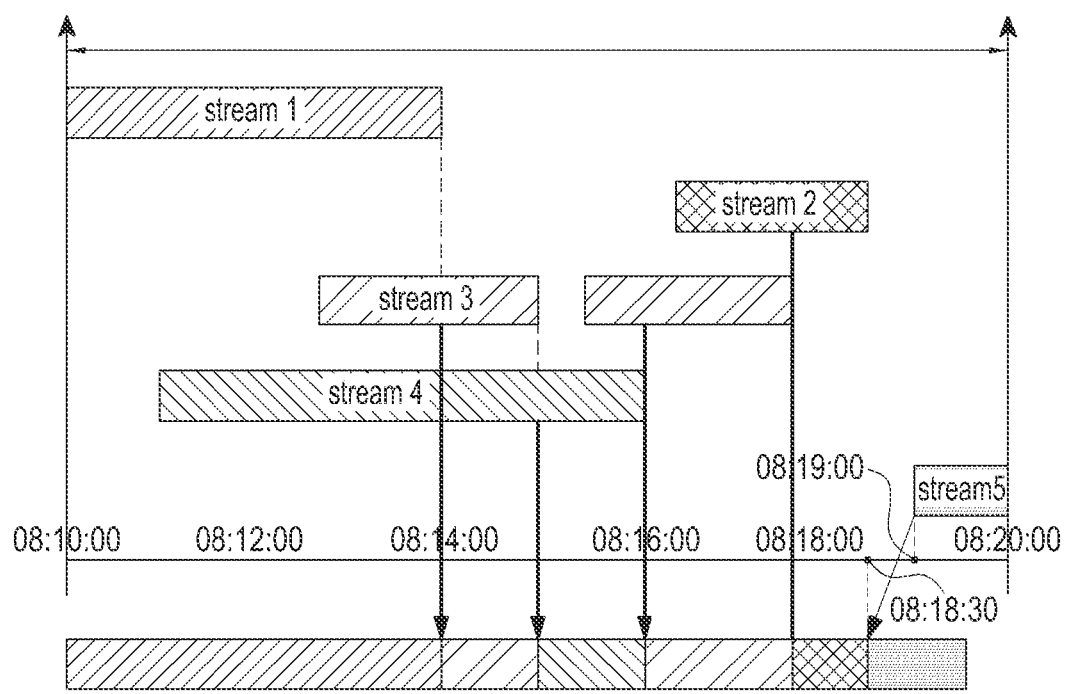

Steps 609 and 610 will be described with reference to FIG. 14 by way of example. If the first moving image "stream 1" currently playing on the main screen has completed at a time position 08:14:00, the controller 110 connects to and successively plays the third moving image "stream 3" or the fourth moving image "stream 4" including the play completion time point of the first moving image in its play time.

If there are a plurality of candidate groups, such as the third moving image "stream 3" or the forth moving image "stream 4", a moving image captured in the closest distance in terms of a GPS distance is preferentially connected and successively played.

Alternatively, unless there is another moving image including the play completion time point of the corresponding moving image in its play time, the controller 110 detects the absence in step 609 and connects to and successively plays another moving image temporally closest in the play progress direction in step 611.

Steps 609 and 611 will be described with reference to FIG. 14 by way of example. If the second moving image "stream 2" currently playing on the main screen has completed at a time position 08:18:30, in a case of the absence of the other moving image including the play completion time point of the second moving image in its play time, the fifth moving image "stream 5" in the closest time position 08:19:00 is connected and successively played.

Referring back to FIGS. 5A and 5B, a plurality of moving images are played as one moving image in a time order on the main screen of the display unit, and during the playing of the plurality of moving images on a respective one of the plurality of sub screens, upon selection of moving-image change on the main screen, the controller 110 detects the selection in step 508, and plays the selected moving image on the main screen and plays a moving image, which was played on the main screen prior to the selection, on a corresponding sub screen on which the selected moving image was played, in step 509. The controller 110, when playing the selected moving image on the main screen, plays the selected moving image from the current time point displayed in the main progressive bar in the total play time of the selected moving image.

In step 509, switching between a moving image of the main screen and a moving image of a selected corresponding sub screen according to the moving image change on the main screen is described, but when a change of a moving image played on the main screen is selected, the selected moving image is played on the main screen and at the same time, the corresponding moving image may be played on the selected sub screen. The operation of the moving image change on the main screen may be performed as described below.

As shown in FIG. 9, a selection box is displayed on a respective one of the plurality of sub screens 162 through 165 which play a respective one of a plurality of moving images, and by selecting a corresponding selection box, a moving image currently played on a corresponding sub screen can be played on the main screen. Alternatively, the main screen is divided into the left and right sides or the upper and lower sides with respect to the center thereof, and the controller 110 plays a moving image having an earlier play time than a moving image currently played on the main screen when the left-side screen/the upper-side screen is touched, or plays a moving image having a later play time than the moving image currently played on the main screen when the right-side screen/the lower-side screen is touched.

When a drag is generated from the left to the right, from the right to the left, from the upper to the lower, and from the lower to the upper on the main screen, the controller 110 sequentially displays a still image corresponding to the current play time point for a respective one of the plurality of moving images included in the playlist, and once generation of a drag has completed during the playing of the still image corresponding to the current play time point for a respective one of the plurality of moving images, the controller 110 connects a moving image corresponding to a still image displayed at an end time point of drag generation to a moving image of the main screen and successively plays the moving image.

When a plurality of moving images are played as one moving image in a time order on the main screen of the display unit and a plurality of moving images are played on a plurality of sub screens, respectively, upon selection of storage of the plurality of moving images at a play end time point of the moving image on the main screen, the controller 110 detects the selection in steps 510 and 511, and stores the plurality of moving images, which were played in a time order on the main screen, as one new moving image in step 512. In step 512, the controller 110 changes the plurality of moving images, which were played in a time order on the main screen, into the same format through the audio/video pre-processor 119 and the MUX unit 120 to generate one new moving image file. Alternatively, when pre-processing is not required (e.g., information, such as resolution, sampling rate, and the like, is the same), the controller 110 may generate a moving image as one new bitstream by interleaving frames without additional encoding.

If storage of the plurality of moving images is selected prior to the start of the playing of the plurality of moving images, the controller 110 encodes the plurality of moving images into one moving image in an order they are played, simultaneously with the playing of the plurality of moving images. If the plurality of moving images has completed playing, the controller 110 may store the encoded one moving image.

In step 410 of FIG. 4 in which the terminal 100 accesses the server 200, upon selection of the streaming play mode in the terminal, the controller 110 detects the selection in step 450 and requests the server 200 to play a plurality of moving images corresponding to particular conditions (i.e., particular time and position), and the controller 210 of the server 200 extracts a plurality of moving images corresponding to the conditions from the memory unit 215 according to the request in step 460. The controller 210 generates a playlist for the plurality of moving images, and sequentially transmits the plurality of moving images to the terminal 100 in a streaming manner according to connection information of the playlist in step 470.

Step 470 of sequentially transmitting the plurality of moving images to the terminal 100 in a streaming manner according to the connection information of the playlist will be described with reference to FIGS. 7A through 8.

Referring to FIGS. 7A and 7B, the controller 210 of the server 200 generates one playlist for a plurality of moving images corresponding to conditions requested by the terminal 100 from among a plurality of moving images stored in the memory unit 215 in step 701.

The parser 211 parses capture time, capture position, and other information through position information included in a respective one of the plurality of moving images, and once the parser 211 transmits the parsed information to the controller 210, the controller 210 incorporates connection information including capture time and capture position for a respective one of the plurality of moving images into the playlist in step 702.

Using Equation 1, the controller 210 calculates a total play time of the plurality of moving images in step 703.

In step 703, the controller 210 extracts connection information from each moving image registered in the playlist, sets a play start time point of a moving image having the earliest start point of a play time as a start time, and sets a play end time point of a moving image having the latest end point of a play time as an end time. The controller 210 extracts a time (e.g., N durations) of a discontinuous duration of each moving image through discontinuity information included in each moving image registered in the playlist. The discontinuity duration means a predefined time during which capturing is stopped if during capturing of a moving image, the capturing is switched to a stop state and the capturing is resumed after the predefined time, or an empty duration during which any moving image is not played when the plurality of moving images are connected based on the connection information. For example, as show in FIG. 10, "duration1" of the third moving image "stream 3" is a predefined time in which during capturing of the third moving image, the capturing is temporarily stopped, and indicates a discontinuous duration, and "duration2" is an empty duration during which any moving image is not played between the second moving image "stream 2" and the fifth moving image "stream 5" which are connected through connection information, and indicates a discontinuous duration.

Therefore, the controller 210 calculates a total play time for the plurality of moving images registered in the playlist by using Equation 1.

In step 704, the controller 210 transmits to the terminal 100, display information capable of displaying a main screen for playing the plurality of moving images as one moving image, a main progressive bar for displaying a total play time for the plurality of moving images played on the main screen, a plurality of sub screens for playing a respective one of the plurality of moving images, and a plurality of sub main bars for displaying a total play time for a moving image played on a respective one of the plurality of sub screens.

The display information may include information capable of displaying the main screen and the plurality of sub screens separately, information capable of displaying the main progressive bar (i.e., a total play time and a discontinuous duration of the plurality of moving images, and the like), and information capable of displaying the plurality of sub progressive bars (i.e., a play time and a discontinuous duration of the plurality of moving images, and the like).

Therefore, through the display information received from the server 200, as shown in FIG. 9, the terminal 100 displays the main screen 161 and the plurality of sub screens 162 through 165 on the display unit, displays the main progressive bar 161a for displaying a total play time duration of a plurality of moving images sequentially played on the main screen 160 over time under the main screen 160, and displays the plurality of sub progressive bars 162a through 165a for displaying a total play time duration of a corresponding moving image played on a corresponding sub screen to the right of a respective one of the plurality of sub screens 162 through 165.

A total play time duration displayed in a respective one of the plurality of sub progressive bars 162a through 165a is positioned in a corresponding play time duration and is displayed at that position with respect to the total play time duration displayed in the main progressive bar 161a.

The main progressive bar 161a and the plurality of sub progressive bars 162a through 165a interwork, such that when any one progressive bar moves, the other progressive bars all move together. Thus, once the main progressive bar 161a moves as a corresponding moving image is played on the main screen 161, the plurality of sub progressive bars 162a through 165a move together in parallel as indicated by "a".

In the search mode, the main progressive bar 161a and the plurality of sub progressive bars 162a through 165a move together in parallel.

After transmission of the display information to the terminal 100, once a request has been received from the terminal 100 for playing a plurality of moving images, the controller 210 detects the request in step 705, and sequentially transmits a plurality of moving images to be played on the main screen of the display unit of the terminal 100 in a streaming manner according to connection information in step 706. Step 706 will be described with reference to FIG. 8.

At the same time, the controller 210 transmits a plurality of moving images to be played on a plurality of sub screens of the display unit of the terminal 100 in a streaming manner in step 707. In step 707, the controller 210, when transmitting a corresponding moving image to be played on a respective one of the plurality of sub screens in a streaming manner, performs transmission to the terminal 100 sequentially from a moving image including the current play time point of a moving image currently played on the main screen as a play start time point. The controller 210, when receiving a play request from the terminal 100, transmits a moving image played on the main screen of the terminal 100 in a streaming manner, and sequentially transmits a plurality of moving images to be displayed on a plurality of sub screens of the terminal 100.

In a case of the plurality of moving images to be played on the plurality of sub screens, they may be transmitted in a moving image bitstream, or according to performance or a defined mode of the terminal 100, still images, such as thumbnail images or small moving images of low definition, may be sequentially transmitted. For example, the controller 210, while transmitting a corresponding moving image played on the main screen to the terminal 100 in a streaming manner, may sequentially transmit each thumbnail image to be displayed on a respective one of the plurality of sub screens.

The controller 210 may transmit the moving image to be played on the main screen and the plurality of moving images played on the plurality of sub screens in a distributed manner through a plurality of files, or in a grouped manner through a plurality of streams in a single file format.

When playing of the moving image on the main screen has not yet completed, if the plurality of moving images on the plurality of sub screens has completed playing, the controller 210 may transmit only a particular frame image of a corresponding moving image to the terminal 100.

In step 707, the controller 210 may transmit a moving image played on a respective one of the plurality of sub screens in a streaming manner according to a user's selection or in an order that the moving image is registered in the playlist.

When a change of a moving image currently played on the main screen is requested from the terminal 100, the controller 210 converts the moving image into the audio of the changed moving image and outputs the audio, or in the single audio mode, the controller 110 maintains audio transmission having a high priority selected by the user or set by default even when a moving image played on the main screen of the terminal 100 is changed. In the single audio mode, the controller 210 transmits audio having the next high priority if the audio output set by default has completed prior to completion of the playing of the moving image on the main screen. In the single audio mode, the controller 210 transmits audio information of a currently played moving image to the terminal 100 if there is a discontinuous duration in the audio output set by default.

Referring to FIG. 8, a description will be made of a process of transmitting, by the server, a plurality of moving images sequentially in an order that they are connected through connection information to play the plurality of moving images as one moving image on the main screen of the terminal in step 706. In step 801, a moving image among a plurality of moving images to be played on the main screen of the terminal 100 is transmitted. In step 802, the controller 210 determines whether there is a discontinuous duration from discontinuity information included in the corresponding moving image. If the discontinuous duration is detected in the corresponding moving image, the controller 210 determines whether there is another moving image in the playlist including the discontinuous duration of the corresponding moving image in its play time in step 803. If another moving image including the discontinuous duration of the moving image in its play time is detected in step 803, the controller 210 transmits the other moving image in that discontinuous duration during the playing of the corresponding moving image in step 804.

Steps 803 and 804 will be described with reference to FIG. 11 by way of example. During transmission of the third moving image "stream 3" to be played on the main screen of the terminal, if there is a discontinuous duration "duration1" for about 00:00:30 seconds at a time position 08:15:00, the fourth moving image "stream 4" including the time position 08:15:00 in its play time is connected and successively transmitted.

Alternatively, if there are a plurality of candidate groups including the discontinuous duration in their respective play times, a moving image captured in the closest distance in terms of a GPS distance may be preferentially connected and successively transmitted.

Unless there is another moving image including the discontinuous duration of the corresponding moving image in its play time, the controller 210 detects the absence in step 803 and transmits a moving image temporally closest in a play progress direction in step 805.

Alternatively, unless there is another moving image including the discontinuous duration of the corresponding moving image in its play time, the controller 210 skips the discontinuous duration and transmits the corresponding moving image from an end time point of the discontinuous duration.

Steps 803 and 805 will be described with reference to FIG. 12 by way of example. During transmission of the third moving image "stream 3" to be played on the main screen of the terminal 100, in a case of existence of a discontinuous duration "duration1" for about 00:00:30 seconds at the time position 08:15:00, if there is no moving image including the discontinuous duration of the third moving image in its play time, the second moving image "stream 2" in the temporally closest position to the time position 08:15:00, i.e., in the time position 08:15:15, may be connected and successively transmitted.

If the discontinuous duration of the corresponding moving image has completed during the playing of the other moving image in the discontinuous duration of the corresponding moving image in step 804 or 805, the controller 210 detects the end in step 806 and connects back to the corresponding moving image and successively transmits the corresponding moving image in step 807.

Steps 806 and 807 will be described with reference to FIG. 13 by way of example. The second moving image "stream 2" is transmitted in the discontinuous duration "duration1" of the third moving image "stream 3", and at the time position 08:15:30 at which the discontinuous duration "duration1" has completed, the third moving image "stream 3" is connected and successively transmitted.

Alternatively, during the playing of the other moving image in the discontinuous duration of the corresponding moving image in step 804 or 805, the controller 210 waits for completion of the playing of the other moving image which is currently played on the main screen of the terminal, and upon completion of the playing of the other moving image, the controller 210 may connect to and successively transmit the corresponding moving image.

For example, as shown in FIG. 12, the second moving image "stream 2" is transmitted in the discontinuous duration "duration1" of the third moving image "stream 3", and upon completion of the playing of the second moving image "stream 2", the third moving image "stream 3" is transmitted from a play time point corresponding to a time point at which the playing of the second moving image "stream 2" has completed. If the third moving image "stream 3" has completed playing upon completion of the playing of the second moving image "stream 2", the next moving image connected through the connection information is connected and successively transmitted.

When a corresponding moving image to be played on the main screen of the terminal 100 is transmitted in step 807, upon completion of the playing of the corresponding moving image, the controller 210 detects the completion in step 808 and determines whether among the plurality of moving images of the playlist, there is another moving image including a play completion time point of the corresponding moving image in its play time or another moving image which includes a play completion time point of the corresponding moving image in its play time and is captured in the closest position in step 809.

If another moving image including a play completion time point of the corresponding moving image in its play time or another moving image which includes a play completion time point of the corresponding moving image in its play time and is captured in the closest position is detected in step 809, the controller 210 connects to and successively transmits the other moving image in step 810.

Steps 809 and 810 will be described with reference to FIG. 14 by way of example. If the first moving image "stream 1" currently playing on the main screen of the terminal has completed at a time position 08:14:00, the third moving image "stream 3" or the fourth moving image "stream 4" including a play completion time point of the first moving image in its play time may be connected and successively transmitted.

If there are a plurality of candidate groups like the third moving image "stream 3" or the fourth moving image "stream 4", the controller 210 preferentially connects to a moving image captured in the closest distance in terms of a GPS distance and successively transmits the moving image.

Unless there is another moving image including the play completion time point of the corresponding moving image in its play time, the controller 210 detects the absence in step 809 and connects to and successively transmits another moving image which is temporally closest in the play progress direction in step 811.

Steps 809 and 811 will be described with reference to FIG. 14 by way of example. If the second moving image "stream 2" currently playing on the main screen has completed at a time position 08:18:30, in a case of absence of another moving image including the play completion time point of the second moving image in its play time, the fifth moving image "stream 5" in the temporally closest position 08:19:00 is connected and successively transmitted.

Referring back to FIGS. 7A and 7B, during transmission of the moving image to be played on the main screen and the plurality of moving images to be played on the plurality of sub screens in a streaming manner, if a request for a change of the moving image on the main screen from the terminal 100 is detected in step 708, the controller 210 transmits the selected moving image played on the main screen and transmits the moving image, which was played on the main screen prior to the selection, as a moving image to be played on the corresponding sub screen on which the selected moving image was played in step 709. The controller 210, when transmitting the selected moving image to be played on the main screen, transmits the selected moving image from a play time point corresponding to the current time point displayed in the main progressive bar in a total play time of the selected moving image.

The server 200 transmits to the terminal 100 in advance, change information capable of changing a moving image on the main screen through selection or drag with respect to the left and right screens or upper and lower screens with respect to the center of the main screen, or changing a moving image on the main screen through selection of a corresponding sub screen.

Alternatively, the server 200 transmits to the terminal 100 in advance, change information capable of sequentially displaying a still image corresponding to the current play time point for a respective one of the plurality of moving images included in the playlist when a drag is generated from the left to the right, from the right to the left, from the upper to the lower, and from the lower to the upper on the main screen of the terminal during transmission of the plurality of moving images.

Therefore, as shown in FIG. 9, a selection box is displayed on the display unit of the terminal 100 for a respective one of the plurality of sub screens 162 through 165 which plays a respective one of the plurality of moving images, and as the user selects a corresponding selection box, the terminal 100 may request the server 200 to play a moving image currently played on a corresponding sub screen on the main screen.

Alternatively, if the main screen is divided into the left side and the right side or the upper side and the lower side with respect to the center of the main screen in the terminal, in a case of generation of a touch on the left-side screen/the upper-side screen, the controller 210 of the server 200 having received the touch as a moving-image change request may transmit a moving image having an earlier play time than the moving image currently played on the main screen. On the other hand, in a case of generation of a touch on the right-side screen/the lower-side screen, the controller 210 having received the touch as a moving-image change request may transmit a moving image having a later play time than the moving image currently played on the main screen.

When a plurality of moving images to be played on the main screen of the terminal are transmitted in a time order in a streaming manner and a plurality of moving images to be played on a respective one of the plurality of sub screens are transmitted, if storage of the plurality of moving images is selected from the terminal 100 at a time point at which the playing of the moving image on the main screen has completed, the controller 210 detects the selection in steps 710 and 711, and stores the plurality of moving images, which were transmitted in a time order on the main screen, as one new moving image and transmits the new moving image to the terminal 100 in step 712. In step 712, the controller 210 may change the plurality of moving images, which were transmitted in a time order for play on the main screen, into the same format through the audio/video pre-processor 216 and the MUX unit 217, thus generating one new moving image file. Alternatively, when pre-processing is not required (e.g., information, such as resolution, sampling rate, and the like, is the same), the controller 210 may generate a moving image as one new bitstream by interleaving frames without additional encoding. Alternatively, upon receiving a request from the terminal 100 to play and store the plurality of moving images, the controller 210 encodes the plurality of moving images into one moving image in an order that they are transmitted to be played on the main screen of the terminal 100, and upon completion of the transmission of the plurality of moving images, the controller 210 stores the encoded one moving image and transmits the encoded one moving image to the terminal 100.

It can be seen that a moving-image playing method for playing a plurality of moving images as one moving image can be implemented with hardware, software, or a combination of hardware and software. Such arbitrary software may be stored, whether or not erasable or re-recordable, in a volatile or non-volatile storage, such as a Read-Only Memory (ROM), a memory, such as a Random Access Memory (RAM), a memory chip, a device, or an integrated circuit, and an optically or magnetically recordable and machine (e.g., computer)-readable storage medium, such as a Compact Disc (CD), a Digital Versatile Disk (DVD), a magnetic disk, a magnetic tape, and the like. The moving-image playing apparatus and method can be implemented by a computer as well as a terminal including a controller and a memory, and the memory is an example of a machine-readable storage medium which is suitable for storing a program or programs including instructions for implementing the exemplary embodiments of the present invention. Therefore, exemplary embodiments of the present invention include a program including codes for implementing an apparatus or method claimed in an arbitrary claim and a machine (i.e., a computer, and the like)-readable storage medium for storing such a program.

In addition, the moving-image playing apparatus and method for playing a plurality of moving images as one moving image can be made in portable terminals, hand-held terminals, wireless terminals, and any other device capable of playing moving images. Any device to which exemplary embodiments of the present invention are applicable may receive and store the program from a program providing device connected in a wireless or wired manner. The program providing device may include a memory for storing a program including instructions allowing the device to which exemplary embodiments of the present invention are applicable to play a plurality of moving images as one moving image, a communication unit for performing a wired or wireless communication with the device, and a controller for automatically transmitting a corresponding program to a transceiving device or at the request of the device.

As is apparent from the foregoing description, by providing a moving-image playing apparatus and method, a plurality of moving images captured at various angles in the same time and space can be played in real time without being edited into one moving image.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for playing a plurality of moving images at a terminal, the apparatus comprising:
   a display unit configured to play the plurality of moving images as one moving image; and
   a controller configured to connect the plurality of moving images through connection information for a respective one of the plurality of moving images to play the plurality of moving images as one moving image,
   wherein, if playing of the plurality of moving images is selected, the controller generates a playlist comprising the plurality of moving images, plays the plurality of moving images as one moving image on a main screen of the display unit, displays a current play time point of a moving image currently played on the main screen through a main progressive bar, sequentially plays on a corresponding sub screen, a corresponding moving image or thumbnail image comprising the current play time point displayed in the main progressive bar in a play time of the corresponding moving image, and displays a current time point of a moving image currently played on a corresponding sub screen through a corresponding sub progressive bar, and
   wherein during the playing of a currently played moving image on a main screen, if there is a discontinuous duration in the currently played moving image, the controller determines whether there is another moving image comprising the discontinuous duration in its play time, and if there is another moving image comprising the discontinuous duration in its play time, the controller plays the other moving image comprising the discontinuous duration in its play time in that discontinuous duration.

2. The apparatus of claim 1, wherein the controller receives and stores the plurality of moving images through access to a server or wireless data communication.

3. The apparatus of claim 1, wherein the display unit displays:
   the main screen configured to play the plurality of moving images as one moving image;
   a main progressive bar configured to display a total play time of the plurality of moving images played on the main screen;
   a plurality of sub screens configured to play a respective one of the plurality of moving images; and
   a plurality of sub main bars configured to display a total play time of a corresponding moving image played on a respective one of the plurality of sub screens.

4. The apparatus of claim 1, wherein the controller generates the playlist comprising connection information for a respective one of the plurality of moving images, and the connection information comprises capture time and capture position extracted from a respective one of the plurality of moving images.

5. The apparatus of claim 4, wherein the controller, after generating a playlist for the plurality of moving images, calculates a total play time of the plurality of moving images based on the following equation:

$$\text{Total Play Time} = \text{End Time} - \text{Start Time} - N \text{ Durations},$$

wherein "end time" indicates a play end time point of a moving image having the latest play end time point among the plurality of moving images, "start time" indicates a play start time point of a moving image having the earliest play start time point among the plurality of moving images, and "N durations" indicates a time of discontinuous durations generated in the plurality of moving images or between moving images.

6. The apparatus of claim 1, wherein during the playing of the corresponding moving image on the main screen, if there is a discontinuous duration in the currently played moving image, upon completion of the discontinuous duration, the controller plays the corresponding moving image.

7. The apparatus of claim 6, wherein the controller plays the other moving image comprising the discontinuous duration in its play time, and upon completion of the playing of the other moving image, the controller plays the corresponding moving image.

8. The apparatus of claim 1, wherein during the playing of the corresponding moving image on the main screen, if there is a discontinuous duration in the currently played moving image, the controller determines whether there is another moving image comprising the discontinuous duration in its play time, and unless there is another moving image comprising the discontinuous duration in its play time, the controller plays the other moving image which is temporally closest in a play progress direction in that discontinuous duration, and upon completion of the discontinuous duration, the controller plays the corresponding moving image.

9. The apparatus of claim 8, wherein the controller plays the other moving image comprising the discontinuous duration in its play time, and upon completion of the playing of the other moving image, the controller plays the corresponding moving image.

10. The apparatus of claim 1, wherein upon completion of the playing of the corresponding moving image on the main screen, the controller determines whether there is another moving image comprising a play completion time point of the corresponding moving image in its play time, and if there are a plurality of other moving images comprising the play completion time point in their play times, the controller plays, among the plurality of other moving images, another moving image which comprises the play completion time point in its play time or another moving image which comprises the play completion time point in its play time and is captured in the closest position to the play-completed moving image.

11. The apparatus of claim 10, wherein unless there is another moving image comprising the play completion time point in its play time, the controller plays another moving image which is temporally closest in a play progressive direction.

12. The apparatus of claim 1, wherein if a change of a corresponding moving image played on the main screen is selected, the controller plays the moving image of the corresponding sub screen on the main screen from a current play time point displayed in the main progressive bar, and plays the moving image played on the main screen prior to the selection on the corresponding sub screen or displays the moving image of the corresponding sub screen on both the main screen and the corresponding sub screen at the same time.

13. The apparatus of claim 12, wherein the controller changes the moving image of the main screen through selection or a drag on left and right screens or upper and lower screens with respect to a center of the main screen, or changes the moving image of the main screen through selection of a corresponding sub screen.

14. The apparatus of claim 1, wherein in a single audio mode, the controller maintains audio output set by default when the moving image played on the main screen is changed, and outputs audio of a currently-played moving image if there is a discontinuous duration in the audio output set by default.

15. The apparatus of claim 1, wherein the controller stores the plurality of moving images as one moving image in an order that they are played, if storage of the plurality of moving images is selected prior to playing of the plurality of moving images or after completion of the playing of the plurality of moving images.

16. An apparatus for playing a plurality of moving images at a server, the apparatus comprising:
a controller configured to connect or convert the plurality of moving images as or into one moving image through connection information for a respective one of the plurality of moving images, and to perform a control operation to sequentially transmit the plurality of moving images according to the connection information in a streaming manner to a terminal; and
a transmitter configured to sequentially transmit the plurality of moving images in the streaming manner to the terminal,
wherein if playing of the plurality of moving images is requested from the terminal, the controller generates a playlist comprising the plurality of moving images and sequentially transmits the plurality of moving images to be played on a main screen of a display unit, and
wherein during the transmitting of a currently played moving image on a main screen, if there is a discontinuous duration in the currently played moving image, the controller determines whether there is another moving image comprising the discontinuous duration in its play time, and if there is another moving image comprising the discontinuous duration in its play time, the controller transmits the other moving image comprising the discontinuous duration in its play time in that discontinuous duration,
wherein upon completion of playing of the corresponding moving image on the main screen, the controller determines whether there is another moving image comprising a play completion time point of the corresponding moving image in its play time, and if there is another moving image comprising the play completion time point in its play time, the controller transmits another moving image which comprises the play completion time point in its play time and is captured in the closest position to the play-completed moving image.

17. The apparatus of claim 16, wherein the controller extracts the plurality of moving images corresponding to conditions requested from the terminal.

18. The apparatus of claim 16, wherein the controller transmits to the terminal, display information capable of displaying:
the main screen configured to play the plurality of moving images as one moving image;
a main progressive bar configured to display a total play time of the plurality of moving images played on the main screen;
a plurality of sub screens configured to play a respective one of the plurality of moving images; and
a plurality of sub main bars configured to display a total play time of a corresponding moving image played on a respective one of the plurality of sub screens.

19. The apparatus of claim 16, wherein the controller generates the playlist comprising connection information for a respective one of the plurality of moving images, and
the connection information comprises capture time and capture position extracted from a respective one of the plurality of moving images.

20. The apparatus of claim 19, wherein the controller, after generating a playlist for the plurality of moving images, calculates a total play time of the plurality of moving images based on the following equation:

Total Play Time=End Time−Start Time−$N$ Durations, wherein "end time" indicates a play end time point of a moving image having the latest play end time point among the plurality of moving images, "start time" indicates a play start time point of a moving image having the earliest play start time point among the plurality of moving images, and "N durations" indicates a time of discontinuous durations generated in the plurality of moving images or between moving images.

21. The apparatus of claim 20, wherein the controller sequentially transmits the plurality of moving images to be played on a main screen of a display unit of the terminal according to connection information in a streaming manner, and transmits the plurality of moving images or thumbnail images played on a plurality of sub screens in a streaming manner.

22. The apparatus of claim 21, wherein during transmission of a corresponding moving image to be played on the main screen, if there is a discontinuous duration in the corresponding moving image, upon completion of the discontinuous duration, the controller transmits the corresponding moving image.

23. The apparatus of claim 22, wherein the controller transmits another moving image comprising the discontinuous duration in its play time, and upon completion of the playing of the other moving image, the controller transmits the corresponding moving image.

24. The apparatus of claim 21, wherein during transmission of a corresponding moving image to be played on the main screen, if there is a discontinuous duration in the corresponding moving image, the controller determines whether there is another moving image comprising the discontinuous duration in its play time, and unless there is another moving image comprising the discontinuous duration in its play time, the controller transmits another moving image which is temporally closest in a play progress direction in that discontinuous duration, and upon completion of the discontinuous duration, the controller transmits the corresponding moving image.

25. The apparatus of claim 24, wherein the controller transmits another moving image comprising the discontinuous duration in its play time, and upon completion of the playing of the other moving image, the controller transmits the corresponding moving image.

26. The apparatus of claim 16, wherein unless there is another moving image comprising the play completion time point in its play time, the controller transmits another moving image which is temporally closest in a play progress direction.

27. The apparatus of claim 16, wherein if a change of a corresponding moving image played on the main screen is requested from the terminal, the controller transmits a moving image of a corresponding sub screen as a moving image of the main screen, transmits a moving image played on the main screen prior to the selection as a moving image of a corresponding sub screen, or transmits the moving image of the corresponding sub screen to both the main screen and the corresponding sub screen at the same time.

28. The apparatus of claim 27, wherein the controller transmits at the terminal, change information capable of changing the moving image of the main screen through selection or a drag on left and right screens or upper and lower screens with respect to a center of the main screen, or changing the moving image of the main screen through selection of a corresponding sub screen.

29. The apparatus of claim 21, wherein in a single audio mode, the controller transmits, at the terminal, audio information for maintaining audio output set by default when the moving image played on the main screen is changed, and transmits audio information of a currently played moving image if there is a discontinuous duration in the audio output set by default.

30. The apparatus of claim 16, wherein the controller stores and transmits to the terminal, the plurality of moving images as one moving image in an order that they are played, if storage of the plurality of moving images is selected prior to playing of the plurality of moving images or after the completion of the playing of the plurality of moving images.

31. A method for playing a plurality of moving images at a terminal, the method comprising:
accessing a server to receive and store the plurality of moving images corresponding to conditions; and
connecting the plurality of moving images through connection information for a respective one of the plurality of moving images to play the plurality of moving images as one moving image;
if playing of the plurality of moving images is selected, generating a playlist comprising the plurality of moving images, playing the plurality of moving images as one moving image in an order that they are connected through connection information on a main screen of the display unit, displaying a current play time point of a moving image currently played on the main screen through a main progressive bar, sequentially playing on a corresponding sub screen, a corresponding moving image or thumbnail image comprising the current play time point displayed in the main progressive bar in a play time of the corresponding moving image, and displaying a current time point of a moving image currently played on a corresponding sub screen through a corresponding sub progressive bar, and
wherein during the playing of a currently played moving image on a main screen, if there is a discontinuous duration in the currently played moving image, the controller determines whether there is another moving image comprising the discontinuous duration in its play time, and if there is another moving image comprising the discontinuous duration in its play time, the controller plays the other moving image comprising the discontinuous duration in its play time in that discontinuous duration.

32. The method of claim 31, further comprising:
generating the playlist comprising connection information for a respective one of the plurality of moving images; and
calculating a total play time of the plurality of moving images after generating the playlist for the plurality of moving images,
wherein the connection information comprises capture time and capture position extracted from a respective one of the plurality of moving images.

33. The method of claim 32, wherein the total play time of the plurality of moving images is calculated based on the following equation:

Total Play Time=End Time−Start Time−$N$ Durations, wherein "end time" indicates a play end time point of a moving image having the latest play end time point among the plurality of moving images, "start time" indicates a play start time point of a moving image having the earliest play start time point among the plurality of moving images, and "N durations" indicates a time of discontinuous durations generated in the plurality of moving images or between moving images.

34. The method of claim 31, further comprising:
during the playing of the corresponding moving image on the main screen, if there is a discontinuous duration in the currently-played moving image,
upon completion of the discontinuous duration, playing the corresponding moving image.

35. The method of claim 34, further comprising upon completion of the playing of the other moving image comprising the discontinuous duration in its play time, playing the corresponding moving image.

36. The moving-image playing method of claim 31, further comprising:
during the playing of the corresponding moving image on the main screen, if there is a discontinuous duration in the currently-played moving image, determining whether there is another moving image comprising the discontinuous duration in its play time;
unless there is another moving image comprising the discontinuous duration in its play time, playing another moving image which is temporally closest in a play progress direction in the discontinuous duration; and
upon completion of the discontinuous duration, playing the corresponding moving image.

37. The method of claim 36, further comprising upon completion of the playing of the other moving image which is temporally closest in the play progress direction, playing the corresponding moving image.

38. The method of claim 31, further comprising:
upon completion of the playing of the corresponding moving image on the main screen, determining whether there is another moving image comprising a play completion time point of the corresponding moving image in its play time; and
if there are a plurality of other moving images comprising the play completion time point in their play times, playing another moving image which comprises the play completion time point in its play time or another moving image which comprises the play completion time point in its play time and is captured in the closest position to the play-completed moving image.

39. The method of claim 38, further comprising unless there is another moving image comprising the play completion time point in its play time, playing another moving image which is temporally closest in a play progressive direction.

40. The method of claim 31, further comprising if a change of a corresponding moving image played on the main screen is selected, playing the moving image of a corresponding sub screen on the main screen from a current play time point displayed in the main progressive bar and playing on the corresponding sub screen, the moving image played on the main screen prior to the selection or displaying the moving image of the corresponding sub screen on both the main screen and the corresponding sub screen at the same time.

41. The method of claim 31, further comprising changing the moving image of the main screen through selection or a drag on left and right screens or upper and lower screens with respect to a center of the main screen, or changing the moving image of the main screen through selection of a corresponding sub screen.

42. The method of claim 31, further comprising in a single audio mode, maintaining audio output set by default when the moving image played on the main screen is changed, and outputting audio of a currently-played moving image if there is a discontinuous duration in the audio output set by default.

43. The method of claim 31, further comprising storing the plurality of moving images as one moving image in an order that they are played, if storage of the plurality of moving images is selected prior to the playing of the plurality of moving images or after completion of the playing of the plurality of moving images.

44. A method for playing a plurality of moving images at a server, the method comprising:
  connecting or converting the plurality of moving images as or into one moving image through connection information for a respective one of the plurality of moving images; and
  sequentially transmitting the plurality of moving images according to the connection information in a streaming manner to a terminal,
  wherein the generating of the play information comprises, if playing of the plurality of moving images is requested from the terminal, generating a playlist for the plurality of moving images and sequentially transmitting the plurality of moving images to be played on a main screen of a display unit, and
  wherein during the transmitting of a currently played moving image, if there is a discontinuous duration in the currently played moving image, the controller determines whether there is another moving image comprising the discontinuous duration in its play time, and if there is another moving image comprising the discontinuous duration in its play time, the controller transmits the other moving image comprising the discontinuous duration in its play time in that discontinuous duration,
  wherein upon completion of the playing of the corresponding moving image on the main screen, determining whether there is another moving image comprising a play completion time point of the corresponding moving image in its play time; and if there is another moving image comprising the play completion time point in its play time, transmitting the other moving image which comprises the playing completion time point in its play time or another moving image which comprises the playing completion time point in its play time and is captured in the closest position to the play-completed moving image.

45. The method of claim 44, further comprising extracting the plurality of moving images corresponding to conditions requested from the terminal.

46. The method of claim 44, wherein the playing of the plurality of moving images comprises:
  calculating a total play time of the plurality of moving images,
  wherein the connection information comprises capture time and capture position extracted from a respective one of the plurality of moving images.

47. The method of claim 46, wherein the total play time of the plurality of moving images is calculated based on the following equation:

Total Play Time=End Time−Start Time−$N$ Durations, wherein "end time" indicates a play end time point of a moving image having the latest play end time point among the plurality of moving images, "start time" indicates a play start time point of a moving image having the earliest play start time point among the plurality of moving images, and "N durations" indicates a time of discontinuous durations generated in the plurality of moving images or between moving images.

48. The method of claim 46, wherein the generating of the play information comprises transmitting the plurality of moving images or thumbnail images played on a plurality of sub screens in a streaming manner.

49. The method of claim 48, further comprising:
  determining whether there is a discontinuous duration in a corresponding moving image played on the main screen;
  if there is a discontinuous duration in a corresponding moving image played on the main screen,
  upon completion of the discontinuous duration, transmitting the corresponding moving image.

50. The method of claim 48, further comprising:
  if there is another moving image comprising the discontinuous duration in its play time, transmitting the other moving image comprising the discontinuous duration in its play time; and
  upon completion of the playing of the other moving image, transmitting the corresponding moving image.

51. The method of claim 48, further comprising:
  if there is a discontinuous duration in a corresponding moving image played on the main screen, determining whether there is another moving image comprising the discontinuous duration in its play time;
  unless there is another moving image comprising the discontinuous duration in its play time, transmitting the other moving image which is temporally closest in a play progress direction in the discontinuous duration; and
  upon completion of the discontinuous duration, transmitting the corresponding moving image.

52. The method of claim 51, further comprising:
  playing the other moving image which is temporally closest in the play progress direction; and
  upon completion of the playing of the other moving image, transmitting the corresponding moving image.

53. The method of claim 44, further comprising, unless there is another moving image comprising the playing completion time point in its play time, playing the other moving image which is temporally closest in a play progress direction.

54. The method of claim 48, further comprising, if a change of the moving image played on the main screen is requested from the terminal, transmitting the moving image of the corresponding sub screen as the moving image to be played on the main screen, transmitting the moving image played on the main screen prior to the selection as the moving image of the corresponding sub screen, or transmitting the moving image of the corresponding sub screen to both the main screen and the corresponding sub screen at the same time.

55. The method of claim 54, further comprising transmitting to the terminal, change information capable of changing the moving image of the main screen through selection or a drag on left and right screens or upper and lower screens with respect to a center of the main screen, or changing the moving image of the main screen through selection of the corresponding sub screen.

56. The method of claim 48, further comprising, in a single audio mode, transmitting to the terminal, audio information for maintaining audio output set by default when the moving image played on the main screen is changed, and transmitting audio information of a currently-played moving image if there is a discontinuous duration in the audio output set by default.

57. The method of claim 44, further comprising storing the plurality of moving images as one moving image in an order that they are played and transmitting the moving image to the terminal, if storage of the plurality of moving images is requested from the terminal prior to the playing of the plurality of moving images or after completion of the playing of the plurality of moving images.

* * * * *